(12) United States Patent
Zaetterqvist

(10) Patent No.: US 11,008,099 B2
(45) Date of Patent: May 18, 2021

(54) DEVICE AND METHOD FOR FIRING DIRECTION LIMITATION AND A COUNTERMEASURE ARRANGEMENT

(71) Applicant: SAAB AB, Linkoeping (SE)

(72) Inventor: Christer Zaetterqvist, Uppsala (SE)

(73) Assignee: SAAB AB, Linkoeping (SE)

( * ) Notice: Subject to any disclaimer, the term of this patent is extended or adjusted under 35 U.S.C. 154(b) by 280 days.

(21) Appl. No.: 16/301,282

(22) PCT Filed: May 5, 2017

(86) PCT No.: PCT/SE2017/050442
§ 371 (c)(1),
(2) Date: Nov. 13, 2018

(87) PCT Pub. No.: WO2017/200460
PCT Pub. Date: Nov. 23, 2017

(65) Prior Publication Data
US 2020/0318921 A1 Oct. 8, 2020

(30) Foreign Application Priority Data

May 17, 2016 (SE) .................................... 1650665-1
Nov. 8, 2016 (SE) .................................... 1651465-5

(51) Int. Cl.
*B64D 1/02* (2006.01)
*F41H 11/02* (2006.01)
(Continued)

(52) U.S. Cl.
CPC ................ *B64D 1/02* (2013.01); *B64D 7/00* (2013.01); *F41A 17/08* (2013.01); *F41A 27/00* (2013.01);
(Continued)

(58) Field of Classification Search
CPC .. F41A 27/00; F41A 27/08; F41F 1/08; F42B 12/70
(Continued)

(56) References Cited

U.S. PATENT DOCUMENTS 2,391,956 A    1/1946 Eastman
2,434,653 A *  1/1948 Holschuh ................. B64D 7/02
                                                     89/37.17
(Continued)

FOREIGN PATENT DOCUMENTS

DE         3902624       *  8/1990  .............. F41A 27/08
DE         3902624 A1       8/1990
(Continued)

OTHER PUBLICATIONS

International Searching Authority, International Search Report and Written Opinion for International Application No. PCT/SE2017/050438, dated Jul. 27, 2017, (12 pages), Swedish Patent and Registration Office, Sweden.
(Continued)

*Primary Examiner* — Samir Abdosh
(74) *Attorney, Agent, or Firm* — Alston & Bird LLP

(57) ABSTRACT

Firing direction limitation device (15) for controlling the allowed launch angle range of a directable firing device (10) tiltable between at least two allowed maximum launch angles (MaxLA1, MaxLA2) defining a launch sector (4), wherein the firing direction limitation device (15) comprises a moveable limiting structure (16) configured to be arranged in connection to the directable firing device (10), where the limiting structure (16) is configured to be moveable between a first position (P1) and a second position (P2), wherein, when the limiting structure (16) is set in the first positon (P1), the directable firing device (10) is moveable within a first launch angle range (LARa1), and when the limiting
(Continued)

structure (16) is set in the second positon (P2), the directable firing device (10) is moveable within a second launch angle range (LARa2), wherein the second launch angle range (LARa2) is limited in relation to the first launch angle range (LARa1), whereby the allowed launch angle of the directable firing device (10) is controllable.

18 Claims, 12 Drawing Sheets

(51) Int. Cl.

| | | |
|---|---|---|
| F42B 5/15 | (2006.01) | |
| F41F 7/00 | (2006.01) | |
| F41F 1/08 | (2006.01) | |
| F42B 12/70 | (2006.01) | |
| F41A 17/08 | (2006.01) | |
| F41A 27/08 | (2006.01) | |
| F41A 27/00 | (2006.01) | |
| B64D 7/00 | (2006.01) | |

(52) U.S. Cl.
CPC .............. *F41A 27/08* (2013.01); *F41F 1/085* (2013.01); *F41F 7/00* (2013.01); *F41H 11/02* (2013.01); *F42B 5/15* (2013.01); *F42B 12/70* (2013.01); *F41F 1/08* (2013.01)

(58) Field of Classification Search
USPC .............................................. 89/37.16, 41.18
See application file for complete search history.

(56) References Cited

U.S. PATENT DOCUMENTS

| | | | | |
|---|---|---|---|---|
| 2,434,654 | A * | 1/1948 | Watkins | F41A 27/02 |
| | | | | 192/138 |
| 2,467,514 | A * | 4/1949 | Woodman | F41A 27/02 |
| | | | | 89/41.18 |
| 3,808,595 | A | 4/1974 | Coop et al. | |
| 3,808,940 | A * | 5/1974 | Schillreff | F41F 3/042 |
| | | | | 89/1.1 |
| 3,934,846 | A | 1/1976 | Maurer | |
| 4,280,394 | A * | 7/1981 | Singenberger | B63G 1/00 |
| | | | | 89/37.02 |
| 4,674,393 | A | 6/1987 | Schaulin et al. | |
| 5,062,347 | A * | 11/1991 | Allais | F41A 27/08 |
| | | | | 89/37.07 |
| 5,198,609 | A | 3/1993 | Gillman | |
| 5,269,214 | A * | 12/1993 | Badura | F41F 1/08 |
| | | | | 42/105 |
| 5,340,054 | A | 8/1994 | Smith et al. | |
| 5,699,981 | A | 12/1997 | McGrath et al. | |
| 6,098,925 | A | 8/2000 | Burdsall, II et al. | |
| 6,231,002 | B1 | 5/2001 | Hibma et al. | |
| 7,640,858 | B1 | 1/2010 | Herbage et al. | |
| 9,322,613 | B2 * | 4/2016 | Oberdick | F41A 19/59 |
| 10,486,813 | B2 * | 11/2019 | Zaetterqvist | F42B 5/15 |
| 10,495,424 | B2 * | 12/2019 | Zaetterqvist | F41F 1/085 |
| 2001/0015126 | A1 * | 8/2001 | Grunewald | F41F 1/08 |
| | | | | 89/1.41 |
| 2003/0117309 | A1 | 6/2003 | Pappert et al. | |
| 2004/0104309 | A1 | 6/2004 | Segota et al. | |
| 2005/0204910 | A1 | 9/2005 | Padan | |
| 2010/0294119 | A1 | 11/2010 | Buechler et al. | |
| 2010/0326262 | A1 | 12/2010 | Galanti et al. | |
| 2011/0030541 | A1 * | 2/2011 | Barlow | F41A 23/24 |
| | | | | 89/1.41 |
| 2011/0155856 | A1 | 6/2011 | Zachrisson | |
| 2012/0125183 | A1 | 5/2012 | Zätterqvist | |
| 2012/0210855 | A1 | 8/2012 | Clark et al. | |
| 2016/0018187 | A1 * | 1/2016 | Oberdick | F41F 1/08 |
| | | | | 89/1.41 |
| 2016/0121996 | A1 | 5/2016 | Eveker et al. | |
| 2019/0092469 | A1 * | 3/2019 | Zaetterqvist | F41A 17/08 |
| 2019/0137220 | A1 * | 5/2019 | Zaetterqvist | G01S 13/87 |
| 2019/0178613 | A1 | 6/2019 | Zaetterqvist | |
| 2019/0193857 | A1 * | 6/2019 | Zatterqvist | F41A 27/24 |
| 2019/0283878 | A1 * | 9/2019 | Zaetterqvist | B64D 1/02 |

FOREIGN PATENT DOCUMENTS

| | | |
|---|---|---|
| EP | 0253028 B1 | 8/1990 |
| EP | 1247735 A3 | 1/2004 |
| EP | 1194331 B1 | 5/2004 |
| EP | 2157398 A2 | 2/2010 |
| EP | 2279119 B1 | 12/2015 |
| EP | 2421754 B1 | 10/2016 |
| GB | 2410542 A | 8/2005 |
| GB | 2505721 A1 | 3/2014 |
| WO | WO 2010/123422 A1 | 10/2010 |
| WO | WO-2014/140587 A1 | 9/2014 |
| WO | WO-2015/072901 A1 | 5/2015 |

OTHER PUBLICATIONS

International Searching Authority, International Search Report and Written Opinion for International Application No. PCT/SE2017/050436, dated Jul. 21, 2017, 12 pages, Swedish Patent and Registration Office, Sweden.

International Searching Authority, International Search Report and Written Opinion for International Application No. PCT/SE2017/050440, dated Jul. 21, 2017, 12 pages, Swedish Patent and Registration Office.

International Searching Authority, International Search Report and Written Opinion for International Application No. PCT/SE2017/050437, dated Jul. 21, 2017, 12 pages, Swedish Patent and Registration Office.

International Searching Authority, International Search Report and Written Opinion for International Application No. PCT/SE2017/050441, dated Jul. 21, 2017, 13 pages, Swedish Patent and Registration Office.

International Searching Authority, International Search Report and Written Opinion for International Application No. PCT/SE2017/050442, dated Aug. 4, 2017, 14 pages, Swedish Patent and Registration Office.

Extended European Search Report for European Patent Application No. 17799760.8, dated Nov. 18, 2019, (8 pages), European Patent Office, Munich, Germany.

Extended European Search Report for European Patent Application No. 17799758.2, dated Nov. 21, 2019, (6 pages), European Patent Office, Munich, Germany.

Extended European Search Report for European Patent Application No. 17799759.0, dated Nov. 21, 2019, (7 pages), European Patent Office, Munich, Germany.

Extended European Search Report for European Patent Application No. 17799763.2, dated Nov. 21, 2019, (7 pages), European Patent Office, Munich, Germany.

Extended European Search Report for European Patent Application No. 17799764.0, dated Nov. 26, 2019, (8 pages), European Patent Office, Munich, Germany.

* cited by examiner

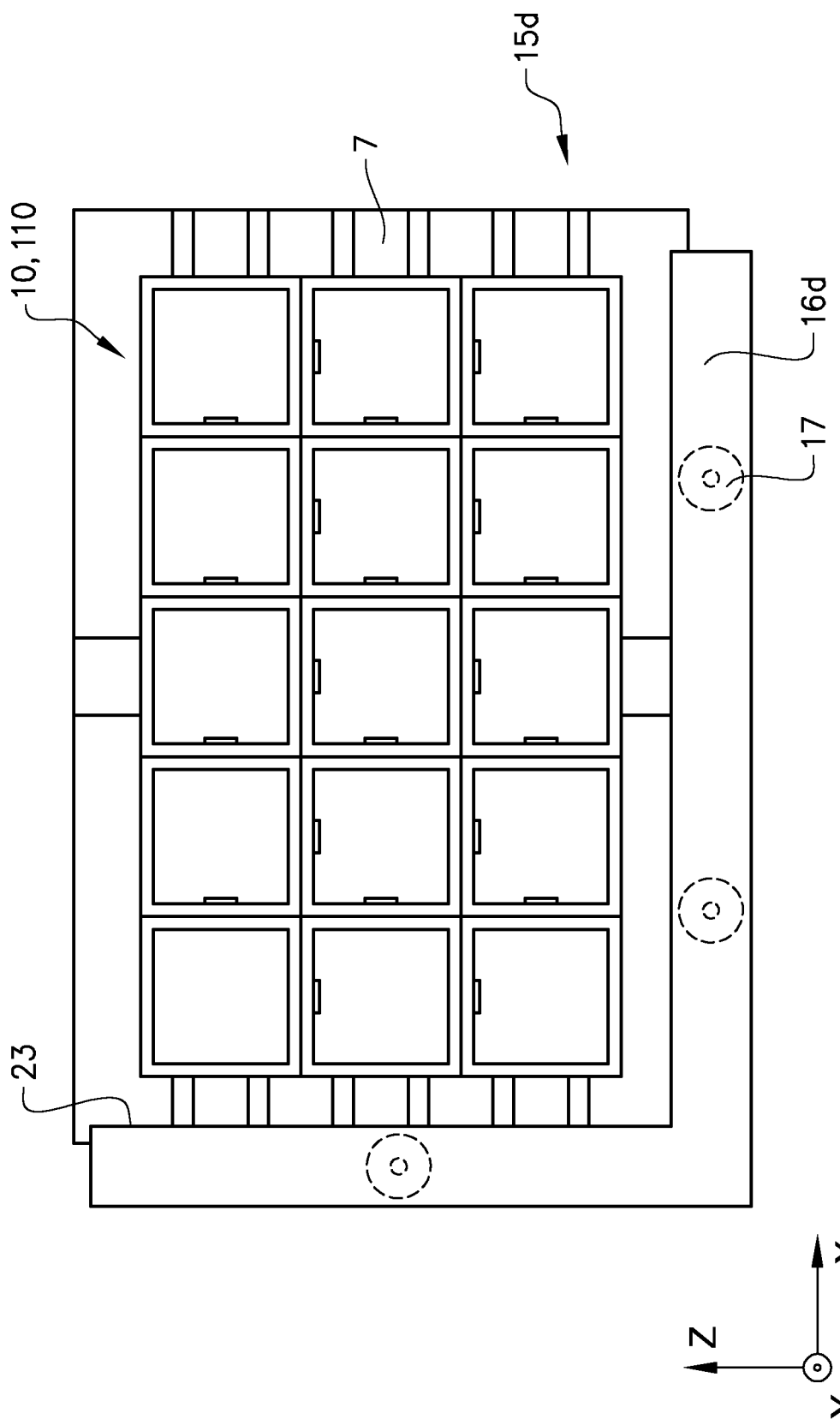

DEVICE AND METHOD FOR FIRING DIRECTION LIMITATION AND A COUNTERMEASURE ARRANGEMENT

CROSS REFERENCE TO RELATED APPLICATIONS

This application is a National State Application, filed under 35 U.S.C. § 371, of International Application No. PCT/SE2017/050442, filed May 5, 2017, which claims priority to Swedish Application No. 1650665-1, filed May 17, 2016, and Swedish Application No. 1651465-5, filed Nov. 8, 2016; the contents of all of which are hereby incorporated by reference in their entireties.

BACKGROUND

Related Field

The present invention relates to a firing direction limitation device for preventing that e.g. flares, chaff, shotgun shots, pellet loads or similar are fired in a direction exposing friendly personnel or vehicles to danger.

Description of Related Art

Arrangements for storing and launching payloads, such as countermeasures, which are designed to be mounted on aircrafts such as helicopters or fighters, are previously known. The countermeasures are connected to a firing control device for feeding firing signals to the countermeasures. The countermeasures may consist of passive means, such as chaff foil, but can also consist of for example IR flares, or other active measures. The countermeasures are stored in one or more magazines, where a magazine comprises a plurality of cartridges, preferably with one countermeasure in each cartridge.

One problem with known dispensers and magazines mounted on aircrafts is that the launch angle of a countermeasure is fixed to a set angle which is believed to be optimal for the intended use. Depending on the purpose of the countermeasure, it may be of advantage to use different firing directions. If chaff is released, a preferred launch direction may be upwards towards a helicopter rotor, if flares are released, a preferred launch direction may be somewhat forwards and downwards. A dispenser mounted on a helicopter may therefore be provided with several magazines, directed in different directions. A solution with a fixed launch angle may be a good solution for an aeroplane, which has a known flight direction and a known speed range.

For a helicopter, a fixed launch angle is however not optimal, since both flight angle, flight speed and the orientation of the aircraft may vary considerably. Helicopters may be provided with several magazines holding cartridges with countermeasures. Each magazine may be positioned at a predefined position and pointing in a predefined direction on the helicopter, such that several magazines will cover a larger firing range, i.e. launch angle range. It would in some situations also be possible to steer the helicopter such that a desired firing direction of a countermeasure is obtained.

In this description the forward direction of an aircraft is defined as a direction in which the nose of the aircraft is pointing when flying. Thus, when referring to a helicopter the forward direction is defined as the direction in which the nose of the helicopter essentially is pointing when flying, which is essentially parallel to the horizontal plane, i.e. floor and the rotor of the helicopter are essentially parallel to the horizontal plane.

A solution at least partially alleviating or eliminating the drawbacks and problems associated with prior art solutions, is to arrange the magazine in a directable manner such that the firing direction of e.g. flares, chaff or similar can be controlled, i.e. selected, by means of what is referred to as having a variable magazine. However, having a directable variable magazine for which the firing direction is controllable or selectable may be problematic since, depending on where the variable magazine is arranged on the aircraft, if directed in certain directions there may be an imminent risk that the aircraft itself, friendly aircrafts or personnel are exposed to danger, i.e. might get hit or damaged. This is particularly problematic since countermeasure arrangements firing flares or chaff may be activated automatically and might respond to incoming threats without active aircrew consent. Controlling such functionality by means of software is possible, but verifying the reliability of such software, and configuring such software to be fail safe at all times, is difficult and costly.

Thus, there is still a need of improvements and further development.

BRIEF SUMMARY

An object of the present invention is to at least partially alleviate or eliminate drawbacks associated with the solutions known in the prior art. Another object is to provide a firing direction limitation device for an aircraft, wherein the firing direction limitation device can be used to prevent that in certain situations, such as during loading or unloading of personnel or material, when flying in formation or during normal operation flares, chaff, shotgun shots, pellet loads or similar are not fired in an undesirable direction whereby personnel, the fuselage of the aircraft, main/tail rotors, wings, friendly aircrafts or similar may be damaged. A further object of the present invention is to provide a countermeasure arrangement comprising such a firing direction limitation device. A further object of the present invention is to provide methods for controlling the allowed launch angle range of a directable firing device by means of such a firing direction limitation device. Yet another object of the invention is to provide an aircraft comprising a firing direction limitation device.

The solution to the problem according to the invention is described in the characterizing portion of the independent claim referring to a firing direction limitation device. Further independent claims refer to a countermeasure arrangement comprising a firing direction limitation device, an advantageous method for controlling the allowed launch angle range of a directable firing device and an aircraft comprising a firing direction limitation device. The dependent claims contain advantageous embodiments and further developments of firing direction limitation devices, countermeasure arrangements and methods for controlling the allowed launch angle range of a directable firing device. Please note, the term 'directable' is herein defined as 'being capable of being directed'.

Even though the invention herein primarily will be disclosed in association with a directable firing device capable of firing e.g. flares, chaff or shotgun shots, wherein the directable firing device is disclosed as preferably being a variable magazine, comprising a number of cartridge cases, for which the allowed launch angle range can be controlled, it is considered to be apparent that the inventive concept of the present invention is just as applicable for other directable firing devices, such as e.g. canons or machine guns, as well. However, as is also apparent from the following disclosure of the present invention, controlling the allowed launch angle range of a directable firing device in form of a variable magazine requires additional inventiveness and development than for controlling the allowed launch angle range of a directable firing device in form of e.g. a canon or a machine gun. Thus, it is not apparent that means for controlling the allowed launch angle range of e.g. a canon or a machine gun can be used to control the allowed launch angle range of a variable magazine. This will be discussed more in detail in the following detailed description.

The invention will further be described in association with aircrafts. The invention is however suitable for use with magazines mounted to moving vehicles of all kinds and also magazines mounted in a stationary manner, either fixed on e.g. a building or on a movable stand. The invention can thus be used with magazines on ground, and may be used on a vehicle such as a landing craft, a truck or a battle tank, or may be used in a stationary position on the ground, e.g. by the use of a stand or a tripod. The firing direction limitation device is in this case used with a variable magazine in order to control in which directions that the magazine can be tilted in. In one example, the firing direction limitation devices controls the launch angle of a variable magazine such that it does not cover the exits of a vehicle when a persons is to exit the vehicle.

Allowed launch angles or allowed target area of a directable firing device can obviously be controlled by means of software developed for defining what, when and where firing is allowed. Controlling allowed launch angle ranges by means of software obviously has its advantages in that the software e.g. can be updated rapidly and offers great flexibility. However, for safety arrangements, such as for a firing direction limitation device, it may be preferable to avoid systems based on software. Software based systems generally uses numerous sensors and there is always a risk of malfunctioning software and/or malfunctioning sensors or incorrect sensor inputs. Also, software based application can potentially be hacked and for software based safety arrangements it is hard to verify the reliability, which may prevent such systems from being implemented and/or certificated. Complex software based systems are generally also expensive.

Launch angle may also be referred to as firing angle, particularly when the directable firing device refers to firing device firing shotgun shots, bullets or like.

The present invention refers to a mechanical firing direction limitation device for controlling the allowed launch angle range of a directable firing device configured to be tiltable between at least two allowed maximum launch angles, i.e. between two maximum outwardly directed positions, defining a launch sector. The firing direction limitation device comprises a moveable limiting mechanical structure configured to be arranged in connection with the directable firing device. The limiting structure is configured to be moveable between at least a first position and a second position.

When the limiting structure is set in the first positon the directable firing device is moveable, by being tilted, within a first launch angle range, and when the limiting structure is set in the second positon the directable firing device is moveable within a second launch angle range. The second launch angle range is limited in relation to the first launch angle range, whereby the allowed launch angle range of the directable firing device is controllable.

The directable firing device may at a general level be defined as a device capable of firing e.g. flares, chaff, shotgun shots, pellet loads or similar, having a fixed attachment point around which the directable firing device is tiltable. Thereby the firing or launch direction of the directable firing device is directable over at least a launch angle range extending between the two maximum launch angles. The launch angles between which the directable firing device is tiltable define the launch sector, thus the area over which e.g. countermeasures can be launched. According to the present invention the second launch angle range is smaller than the first launch angle range. The area over which the directable firing device is capable of firing or launching is herein defined as launch sector.

The moveable limiting structure is configured to be arranged in connection with the directable firing device. Being arranged "in connection with" is here defined as being arranged such that by moving between the first and second position the limiting structure can affect the freedom of the directable firing device to move in at least one direction.

The present invention has the exemplary advantage that when the limiting structure is set in the second position the allowed launch angle range of the directable firing device is limited in relation to the allowed launch angle range of the first position. This control, i.e. limitation, of the allowed launch angle range is achieved by means of a mechanical system, i.e. mechanically moving the limiting structure from a first position to a second position, whereby challenges associated with software based systems are avoided. The firing direction limitation device of the present invention may also offer a less expensive system for which the reliability is easier to verify.

This in turn has the advantage that the present invention may be used as a safety arrangement used to control in what direction e.g. flares, chaff, shotgun shots, pellet loads or similar are fired. This may be used to prevent that e.g. the aircraft fuselage, the main/tail rotor of the aircraft, if being in form of a helicopter, or other parts on the aircraft may be hit even if the directable firing device is moveable.

Also, setting the limiting structure of the firing direction limitation device in the second position may be used to define a safe zone. Such a safe zone may e.g. be used to secure that personnel etc. is prevented from being hit when loading or unloading cargo. Such a safe zone may also be used to secure that friendly aircrafts cannot be hit when flying in formation.

The limiting structure is configured to restrict the movements of the directable firing device in at least one direction. The limiting structure may be configured to restrict the movements of the directable firing device in elevation direction, azimuth direction or preferably in both elevation and azimuth direction. As previously mentioned, the allowed launch angle range over which the directable firing device is capable of firing/launching becomes limited when the limiting structure is set in the second position. The effect the limited allowed launch angle range provides in terms of how the directable firing device is restricted from firing is obviously dependent on where and how the directable firing device, provided with the firing direction limitation device, is arranged at the aircraft. Thus, how the limitation structure should be configured is directly dependent on where and how the directable firing device, provided with the firing direction limitation device, is intended to be arranged at the aircraft and should be configured accordingly. Thus, the intended positioning on the aircraft must be considered when using a firing direction limitation device to provide a safe zone when a directable firing device is used.

According to one exemplary aspect of a firing direction limitation device, the second launch angle range is limited in azimuth direction in relation to the first launch angle range, and according to another aspect of a firing direction limitation device the second launch angle range is limited in elevation direction in relation to the first launch angle range.

According to a preferred exemplary aspect of the present invention, the second launch angle range is limited in both azimuth and elevation direction in relation to the first launch angle range. Thereby a limited area, defined in both elevation and azimuth direction, defining how the directable firing device may be tilted in azimuth and elevation direction around an attachment point is defined.

This exemplary aspect of the present invention has the exemplary advantage that when the limiting structure is set in the second position the allowed launch angles in both azimuth and elevation direction of e.g. flares, chaff, shotgun shots, pellet loads or similar can be limited in relation to the allowed launch angles of the first position.

This will be disclosed more in detail in the detailed description.

As previously mentioned, according to yet another exemplary aspect of a firing direction limitation device according to the present invention, the directable firing device is a variable magazine. The variable magazine comprises a plurality of longitudinal cartridge cases forming the variable magazine, wherein each cartridge case comprises side walls and a front opening, and wherein the side walls of two adjacent cartridge cases are arranged to each other in a slidable manner in a longitudinal direction. The variable magazine comprises a tilting means adapted to tilt the cartridge cases such that the openings of the cartridge cases can be directed in a selected direction. Controlling how the variable magazine can be directed, i.e. the allowed maximum launch angles and the allowed launch angel range, requires that additional factors and aspects are considered than for controlling how e.g. a canon or a machine gun can be directed. A variable magazine has, depending on the number of cartridge cases forming the magazine, a defined spatial extension not only in the intended firing direction, which may be considered to be in essentially Y-direction, but also in the two directions which are perpendicular to the firing direction, accordingly X-direction and Z-direction. Thus, the variable magazine has a defined spatial extension in the XZ-plane. Also, since a variable magazine has multiple cartridge openings from which e.g. flares, chaff, shotgun shots, pellet loads or similar may be fired and the positioning of such cartridge openings in X-direction and Z-direction, to use the same system of coordinates as previously used, differ significantly depending on from which individual cartridge case the flare, chaff, shotgun shots or similar is fired, the launch angle of each cartridge has to be taken in consideration when the limiting structure should be configured in order to provide a desired allowed launch angle range limitation, determining e.g. a desired safe zone during loading/unloading of a helicopter. Thus, if the directable firing device is a variable magazine this requires that the limiting structure has to be configured differently, and that additional aspects have to be considered, than if the directable firing device is e.g. a canon or a machine gun.

According to one exemplary aspect of the present invention, the present invention refers to a firing direction limitation device wherein the moveable limiting structure is provided in form of an encircling portion having an inner delimitation surface, wherein the inner delimitation surface determines the second launch angle range. Providing the limiting structure in form of an encircling portion, i.e. in form of a frame structure restricting the tilting movements of the directable firing device in X- and Z-direction (if the directable firing device is directed essentially in the Y-direction) when set in the second position, is an advantageous way to achieve controllability of the allowed launch angle range of the directable firing device. The tilting movements of the directable firing device are restricted by the inner delimitation surface of the limiting structure.

According to further exemplary aspects of the present invention, the present invention refers to a firing direction limitation device wherein the inner delimitation surface of the encircling portion is essentially circular, essentially square, essentially rectangular or irregularly shaped.

The shape of the inner delimitation surface of the limiting structure, of the firing limitation device, is preferably configured in accordance to the intended mounting position of the directable firing device, for which the firing direction limitation device is applied, and according to over what area/in what angles it is desirable to prevent launching or firing. Thereby the allowed firing angles of the directable firing device can be controlled such that e.g. a safe zone is provided when the limiting structure is set in the second position. Depending on current conditions and the configuration or the directable firing device the most suitable shape of the inner delimitation surface may be e.g. essentially circular, essentially square, essentially rectangular or irregularly shaped.

According to yet another exemplary aspect of the present invention the present invention refers to a firing direction limitation device wherein the moveable limiting structure is in form of a sector portion having an inner delimitation surface, wherein the inner delimitation surface determines the second launch angle range. Thus, it is also possible to use a limiting structure which is formed by a portion of a circle, square etc. Such limiting structure has the drawback that only tilting movements in certain angles of a directable firing device can be limited, but has the exemplary advantage that such limiting structure requires less space.

The various aspects of limiting structures possible are discussed more in detail in the detailed description.

According to an exemplary aspect of the present invention, the present invention refers to a firing direction limitation device wherein the movements of the limiting structure are projecting and retracting movements and wherein the projecting/retracting movements are controllable by means of at least one actuator. The actuator is preferably directly controlled by a switch or a control unit operating the actuator without any involvement of software. As will be shown in the detailed description, according to advantageous aspects of the present invention, the limiting structure is configured such that the movement between the first position and the second position of the limiting structure are projecting and retracting movements, and that these movements are controlled by means of at least one actuator.

According to another exemplary aspect of the present invention, the present invention refers to a firing direction limitation device comprising at least one solenoid actuator. Solenoid actuators are a suitable type of actuator for this specific implementation, even if also other actuators, or devices providing the same functionality as an actuator, are possible.

It may be preferable that if the at least one actuator fails, breaks, stop working, lose power or become inoperative in any other way, the default setting of the limitation structure of the firing direction limitation device is the second position, thus that the limited launch angle range will be the default launch angle range.

Thus, according to one aspect of the present invention, the solenoid actuator is spring-loaded. Further, according to yet another exemplary aspect of the present invention, the spring-loading of the actuator, such as e.g. a solenoid actuator, is configured such that the limiting structure of the firing direction limitation device is set in the second position, thus allowing the limiting launch angle range, if the actuator fails, breaks, stop working, lose power or in any other way become inoperative.

The present invention also refers to countermeasure arrangements. Thus, according to an exemplary aspect of the present invention, the present invention refers to a countermeasure arrangement comprising a firing direction limitation device according to any aspect, or a combination of aspects, previously disclosed herein, wherein the firing direction limitation device is arranged in connection with the directable firing device such that the allowed launch angle range of the directable firing device is controllable.

Another exemplary aspect refers to a countermeasure arrangement whereof the directable firing device is a variable magazine.

The variable magazine comprises a plurality of longitudinal cartridge cases forming the variable magazine, wherein each cartridge case comprises side walls and a front opening. The side walls of two adjacent cartridge cases are arranged to each other in a slidable manner in a longitudinal direction, and wherein the variable magazine comprises a tilting means adapted to tilt the cartridge cases, such that the openings of the cartridge cases can be directed in a selected direction.

The above described countermeasure arrangements disclose the same advantages as previously disclose in relation to respective firing direction limitation device.

The present invention further refers to methods for controlling the allowed launch angle range of a directable firing device by means of any aspect of, or a combination of aspects of, a firing direction limitation device as previously disclosed herein.

According to what previously has been disclosed, the directable firing device is configured to be tiltable between at least two allowed launch angles defining a launch sector. The firing direction limitation device further comprises a moveable limiting structure configured to be arranged in connection with the directable firing device, and wherein the limiting structure is configured to be moveable between a first position and a second position. When the limiting structure is set in the first position the directable firing device is moveable within a first launch angle range, and when the limiting structure is set in the second position the directable firing device is moveable within a second launch angle range. The second launch angle range is limited in relation to the first launch angle range.

According to a first, basic exemplary aspect of the present invention, the method simply comprises the method step of, when it is desired to limit the allowed firing range of the directable firing device:
setting the limiting structure in the second position.

The first exemplary aspect of the present invention represents a basic concept of the present invention; when it for some reason, such as e.g. that an aircraft provided with a firing direction limitation device according to the present invention is standing on the ground in order to be able to load/unload cargo or when an aircraft provided with a firing direction limitation device according to the present invention is flying in formation surrounded by friendly aircrafts, the limiting structure is set in the second position. The allowed launch angle range when the limiting structure is set in the second position is limited, thus allows less movements of the directable firing device, in relation to the allowed launch angle range when the limiting structure is set in the first position.

As previously mentioned, according to some exemplary aspects of the present invention, it may be preferable that the directable firing device can be operated in a safe operation mode. Such safe operation mode may be manually selectable or automatically selectable. Thus, according to a second exemplary aspect of the present invention the method comprises the method steps of:
detecting that a safe operation mode is desired, and
setting the limiting structure in the second position if it has been identified that a safe operation mode is desired.

If an aspect of a method is applied that automatically selects a safe operation mode, it is desirable that the detecting operation is mechanical, such as e.g. by using a mechanical door switch or similar. Methods applied in which software has to be involved are, of reasons previously discussed, desirable to avoid.

According to a third exemplary aspect of the present invention, a safe operation mode is detected when one operation from a predefined group of operations is initiated, wherein the predefined group of operations comprises:
opening a side door,
opening a cargo bay door, and
detecting a predefined weight-on-wheels.

Many aircrafts, such as e.g. helicopters, are equipped with a mechanical switch configured to detect when the aircraft is standing on e.g. the ground, thus when the wheel of the aircraft are exposed to a predefined weight (by the helicopter). This, and e.g. that a side or cargo door is opened, can be used to detect that a safe operation mode is desired. When a safe operation mode is detected, the limiting structure is preferably pre-set in the second position, and will not be able to move to the first position.

Thus, according to the third exemplary aspect of the present invention, if at least one of the operations defined above is initiated it is detected that a safe operation mode is desired, whereby the limiting structure is set in the second position, and wherein the allowed launch angle range of e.g. flares, chaff, shotgun shots, pellet loads or similar is limited in relation to the allowed launch angle range of the first position.

An exemplary advantage of exemplary aspects of the present invention using an automatically selectable safe operation mode is that by automatically setting the limiting structure in the second position, whereby the launch sector of the directable firing device is limited, it may e.g. be safe for personnel opening a side door to leave or unload the aircraft even if this has not been communicated to e.g. the pilot of the aircraft.

For aspects of the method wherein manually selecting that the directable firing device is to be operated in a safe mode is applied, this may e.g. be done when the aircraft is flying in formation, when approaching home base or when friendly forces are present nearby the aircraft.

The exemplary aspects of methods for controlling the allowed launch angle range of a directable firing device are preferably performed by means of a control device. The control device is preferably one or more switches directly connected to an actuator, but could also be an electronic control unit comprising logic circuits. The control device could also e.g. comprise a device capable of executing method steps such as e.g. a computer device.

According to yet an exemplary aspect of the present invention, the present invention refers to an aircraft comprising a countermeasure arrangement according to any aspect, or a combination of aspects, previously disclosed.

BRIEF DESCRIPTION OF THE FIGURES

The invention will be described in greater detail in the following detailed description, with reference to the embodiments that are shown in the attached drawings, in which FIG. 1a schematically shows a side view of an aircraft, in form of a helicopter, provided with directable firing devices in form of variable magazines according to an embodiment of the present invention, FIG. 1b schematically shows a top view of an aircraft, in form of a helicopter, provided with directable firing devices in form of variable magazines according to an embodiment of the present invention, FIG. 2a schematically shows a side view of an aircraft, in form of a helicopter, provided with directable firing devices in form of variable magazines according to an embodiment of the present invention in which limiting structures are set in the second position, FIG. 2b schematically shows a top view of an aircraft, in form of a helicopter, provided with directable firing devices in form of variable magazines according to an embodiment of the present invention in which limiting structures are set in the second position, FIG. 3a schematically shows an exemplary embodiment of a directable firing device in form of a variable magazine in an ISO view, FIG. 3b schematically shows an exemplary embodiment of a tilted directable firing device in form of a variable magazine in an ISO view, FIG. 4a schematically shows an exemplary embodiment of a tilted directable firing device from a side view, FIG. 4b schematically shows another exemplary embodiment of a tilted directable firing device from a side view, FIG. 5a schematically shows an exemplary embodiment of a directable firing device in form of a variable magazine from a top view, FIG. 5b schematically shows an exemplary embodiment of a firing direction limitation device wherein the directable firing device in form of a variable magazine is provided with a limiting structure from a top view, FIG. 5c schematically shows another exemplary embodiment of a firing direction limitation device wherein the directable firing device in form of a variable magazine is provided with a limiting structure from a top view, and FIG. 5d schematically shows yet another exemplary embodiment of a firing direction limitation device wherein the directable firing device in form of a variable magazine is provided with a limiting structure from a top view.

DETAILED DESCRIPTION OF VARIOUS EMBODIMENTS

In the following, a detailed description of the different embodiments of the invention is disclosed under reference to the accompanying drawings. All examples herein should be seen as part of the general description and are therefore possible to combine in any way in general terms. Individual features of the various embodiments and methods may be combined or exchanged unless such combination or exchange is clearly contradictory to the overall function of the embodiment or feature. Reoccurring reference signs refer to corresponding elements throughout the detailed description. Same reference signs indexed with different letters generally refers to different possible exemplary embodiments of the same feature. In the description, the invention is described in association with aircrafts. The invention is however suitable for use on ground, either mounted to moving vehicles of all kinds or mounted in a stationary manner.

Figure 1A:
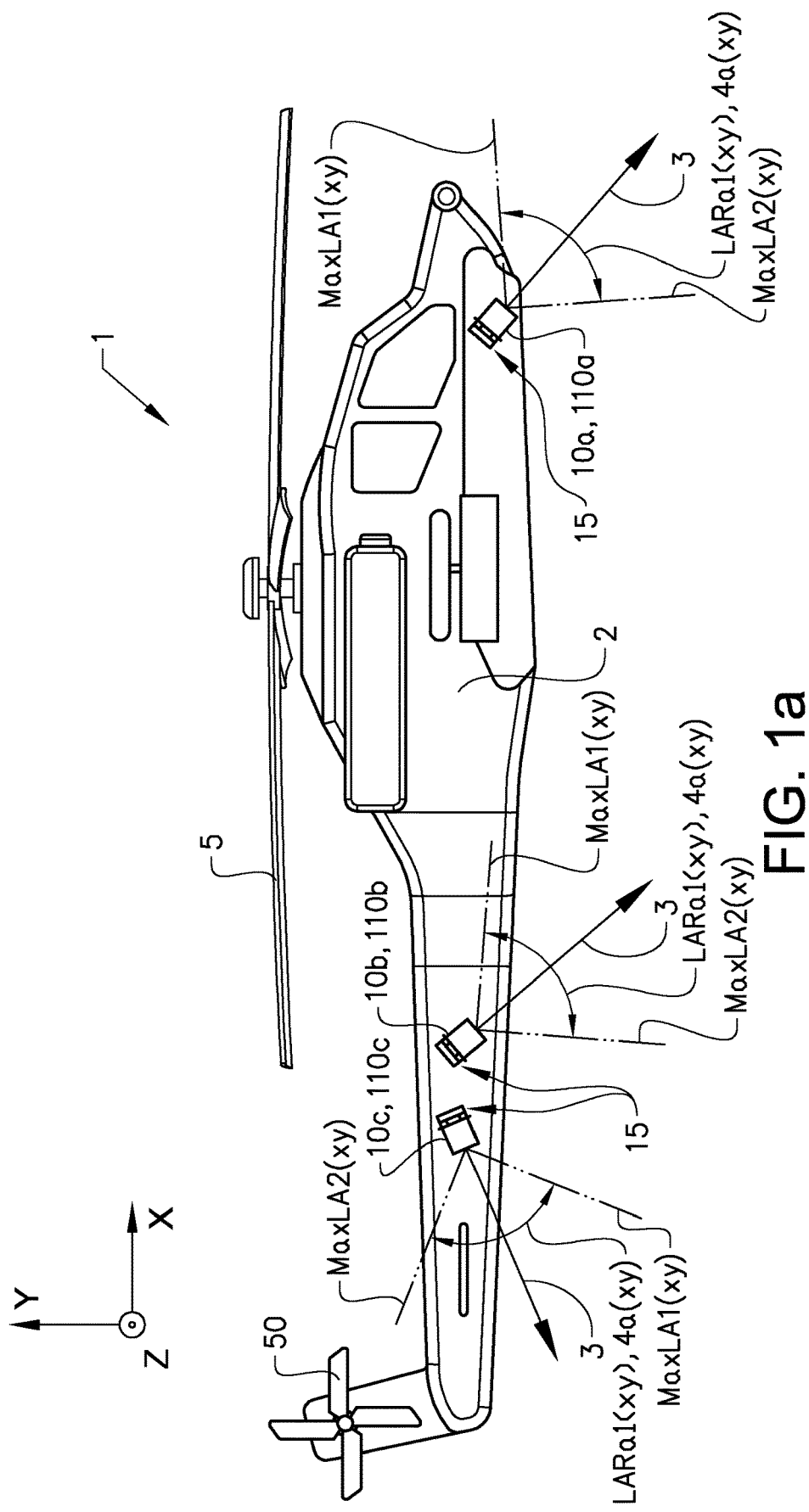

FIG. 1a discloses an exemplary embodiment of an aircraft 1, for the exemplary embodiment of FIG. 1a in form of a helicopter 1, provided with a first 10a, a second 10b and a third 10c directable firing device, in the exemplary embodiment of FIG. 1a in form of a first, second and third variable magazine 110a, 110b, 110c. However, as has been clearly pointed out in the Summary of the invention, the present invention may also be applied for other directable firing devices. The aircraft 1 is further provided with an aircraft fuselage 2, a main rotor 5 and a tail rotor 50.

A coordinate system is indicated in FIG. 1a, wherein the X-direction coincides with the longitudinal direction of the helicopter 1, thus the indicated forward or flight direction of the helicopter 1, the Y-direction is perpendicular to the X-direction and coincides with what is referred to as an elevation or upwards/downwards direction of the helicopter 1. The Z-direction is perpendicular to both the X-direction and the Y-direction. The X-direction and the Z-direction defines a horizontal XZ-plane and the X-direction and Y-direction defines a vertical XY-plane. Motion in the vertical XY-plane is defined as motion in elevation direction and motion in the horizontal XZ-plane is referred to as motion in azimuth direction.

In the exemplary embodiment shown in FIG. 1a, one side of the helicopter 1 is shown. On this side, the first variable magazine 110a is placed at the front of the helicopter 1, pointing substantially forwards-downwards, and the second and the third variable magazines 110b, 110c are placed at the rear of the helicopter 1, wherein the second variable magazine 110b points forwards-downwards and the third variable magazine 110c points rearwards-downwards.

An arrow 3 indicates a current direction of launching of respective directable firing device 10a, 10b, 10c. According to the embodiment disclosed in FIG. 1a the directable firing devices 10a, 10b, 10c are directable, or tiltable, in the vertical XY-plane about 45 degrees in resp. angular direction in relation to the current direction of launching 3, wherein a first launch angle range in the XY-plane LARa1(xy) is defined. This is referred to as movements in elevation direction of the directable firing device 10a, 10b, 10c in the XY-plane. The maximum allowed angle in which the directable firing devices 10a, 10b, 10c can be tilted in respective direction in the XY-plane is referred to as first and second maximum launch angles MaxLA1(xy), MaxLA2(xy). The first launch angle range LARa1(xy) defines an extension in the XY-plane of a first launch sector 4a(xy) over which countermeasures or like may be fired/launched.

Figure 1B:
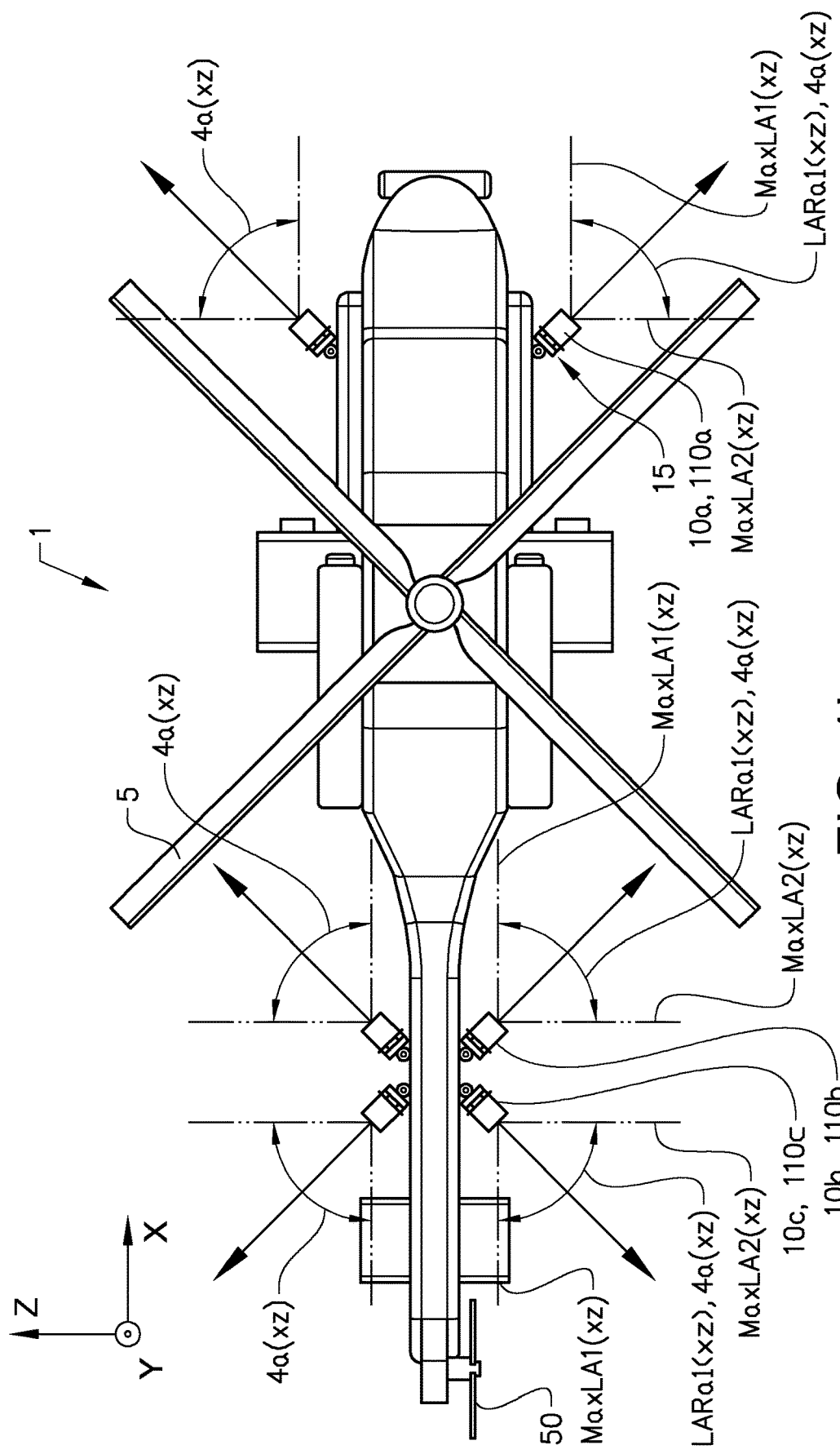

FIG. 1b discloses top view of the aircraft 1, i.e. the helicopter 1. FIG. 1b discloses that the directable firing devices 10a, 10b, 10c are directable, or tiltable, also in the horizontal XZ-plane about 45 degrees in resp. angular direction in relation to the current launch direction 3, wherein a first launch angle range LARa1(xy) also in the XZ-plane is defined. Movements in the XY-plane of the variable magazines 110a, 110b, 110c is referred to as movements in azimuth direction. The maximum allowed angle in which the directable firing devices 10a, 10b, 10c can be tilted in respective direction is referred to as first and second maximum launch angles MaxLA1(xz), MaxLA2(xz). The first launch angle range LARa1(xz) defines an extension in the XZ-plane of the first launch sector 4a(xz) over which countermeasures or like can be fired/launched.

A problem with using directable firing devices 10a, 10b, 10c, such as the variable magazines 110a, 110b, 110c disclosed in the exemplary embodiment shown in FIG. 1a and FIG. 1b, is that if incorrectly used, or if not sufficiently controlled, the possibility of controlling the allowed launch angle range of the directable firing device may put nearby friendly forces in danger or even damage e.g. a main rotor 5, a tail rotor 50 or the fuselage 2 of an aircraft 1.

According to the present invention this problem is solved by means of firing direction limitation devices 15. The firing direction limitation device 15 comprises a limiting structure. The limiting structure is configured to be set in at least a first position and a second position. When the limiting structure is set in the first positon, the directable firing device is moveable within a first launch angle range and when the limiting structure is set in the second positon, the directable firing device is moveable within a second launch angle range, wherein the second launch angle range is limited in relation to the first launch angle range. Thereby the allowed launch angle range of the directable firing device is controllable.

In FIGS. 1a and 1b the limiting structure of the firing direction limitation device 15 is set in the first position wherein the allowed launch angle range is not limited, i.e. the variable magazines 110a, 110b, 110c are free to move by being tilted over the first launch angle range LARa1(xy), LARa1(xz) in elevation and azimuth direction. The variable magazines 110a, 110b, 110c are directable about 45 degrees in respective direction in both the XY-plane and the XZ-plane, i.e. in both elevation and azimuth direction.

Figure 2A:
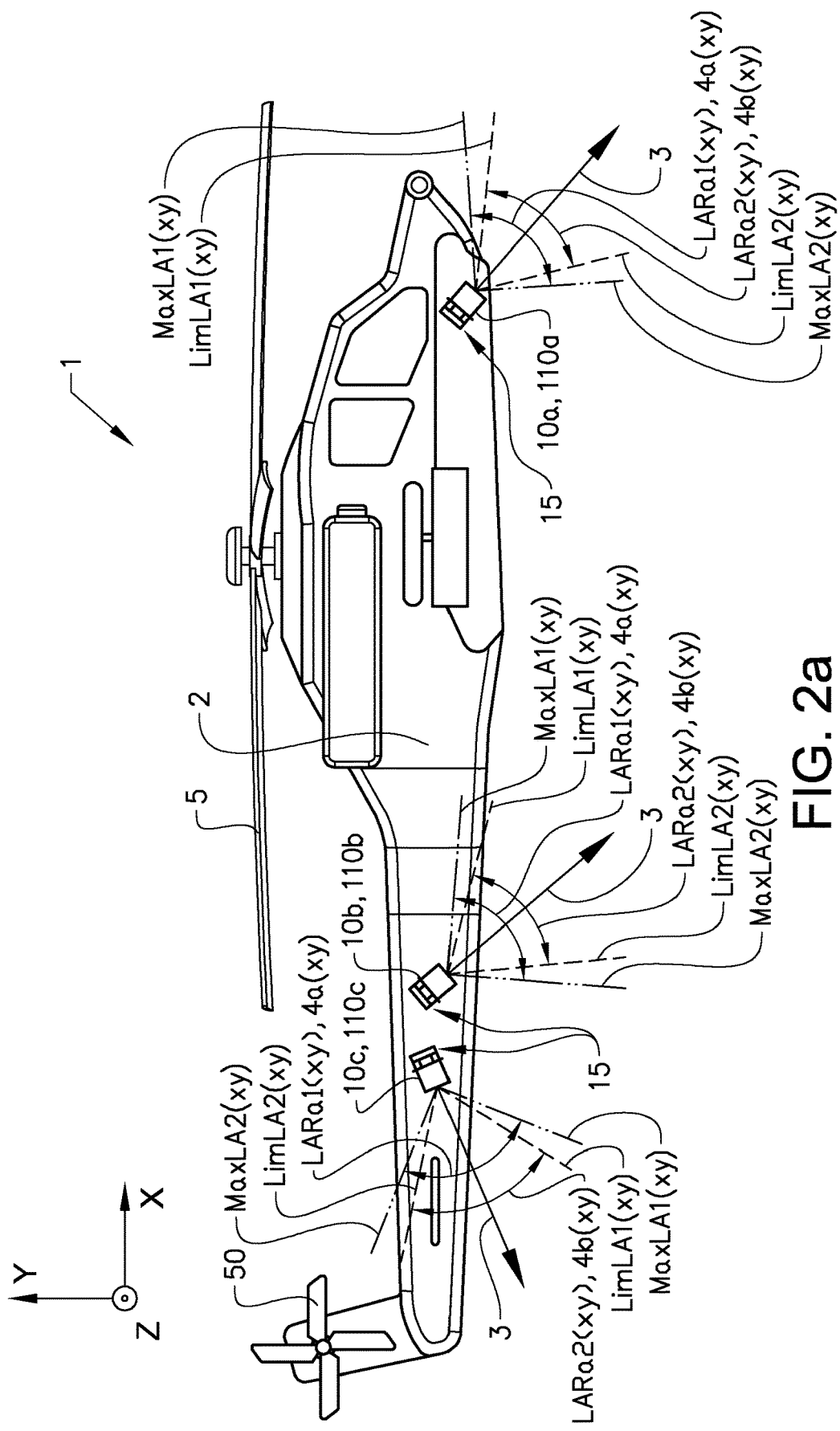
Figure 2B:
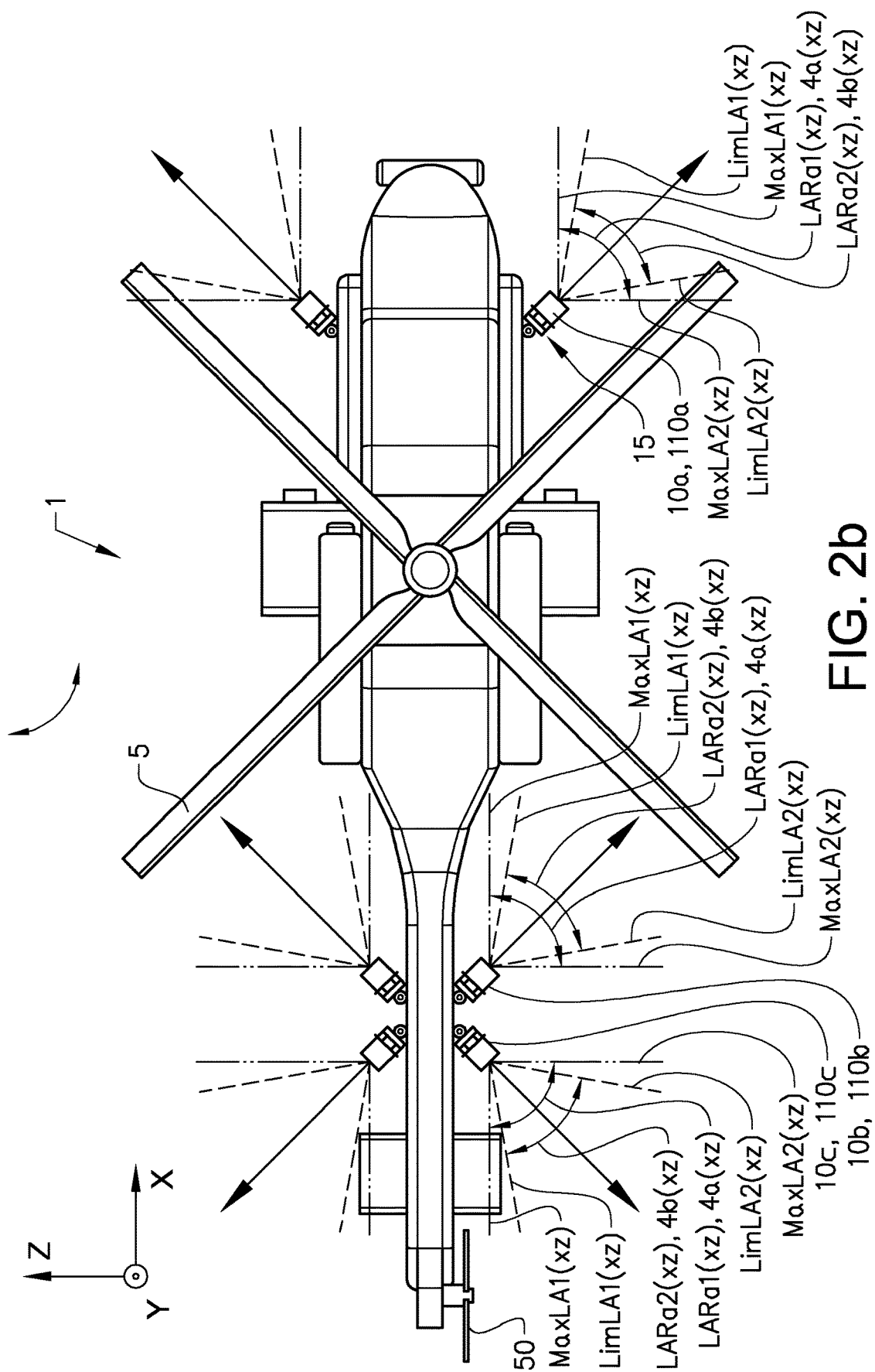

In FIG. 2a and FIG. 2b the limiting structure of the firing direction limitation device 15 is set in the second position wherein the allowed launch angle range is limited, i.e. the variable magazines 110a, 110b, 110c cannot move freely by being tilted over the first launch angle range LARa1(xy), LARa1(xz) in elevation and azimuth direction, but can only move freely over a second launch angle range LARa2(xy), LARa2(xz).

In FIG. 2a and FIG. 2b the maximum allowed angles in which the directable firing devices 10a, 10b, 10c can be tilted in respective direction may be referred to as first and second limited launch angles in elevation, i.e. the XY-plane, LimLA1(xy), LimLA2(xy), and in azimuth, i.e. the XZ-plane, LimLA1(xz), LimLA2(xz). The first and second limited launch angles LimLA1(xy), LimLA2(xy) define the second launch angle range LARa2(xy) in the XY-plane, and the first and second limited launch angles LimLA1(xz), LimLA2(xz) define the second launch angle range LARa2(xz) in the XZ-plane.

The second launch angle range in the XY- and XZ-planes LARa2(xy), LARa2(xz) are limited in relation to first launch angle range in the XY- and XZ-planes LARa1(xy), LARa1(xz). In accordance to what has been disclosed in FIG. 1a, the first launch angle range in the XY- and XZ-planes LARa1(xy), LARa1(xz) are defined by the first and second maximum launch angles in the XY- and XZ-plane, MaxLA1(xy), MaxLA2(xy) and MaxLA1(xz), MaxLA2(xz). This is accomplished by means of the limiting structure of the firing direction limitation device 15 set in the first position, or may be accomplished by mechanical limitations in the directable firing device. When the limiting structure is set in the second position, the allowed launch angle is restricted to the second launch angle range in the XY- and XZ-planes LARa2(xy), LARa2(xz).

According to the exemplary embodiment of FIGS. 1a, 1b, 2a and 2b the directable firing device 10a, 10b, 10c, which according to FIGS. 1a, 1b, 2a and 2b is in form of variable magazines 110a, 110b, 110c, are moveable both in elevation direction, i.e. in the XY-plane, and in azimuth direction, i.e. in the XZ-plane, and the limiting structure of the firing direction limitation device 15 is capable of limiting the tilting movements of the directable firing device 10a, 10b, 10c in both the XY-plane and in the XZ-plane. However, it is also possible that the limiting structure is only configured to limit the tilting movements of the directable firing device 10a, 10b, 10c in either the XY-plane or the XZ-plane.

Figure 3A:
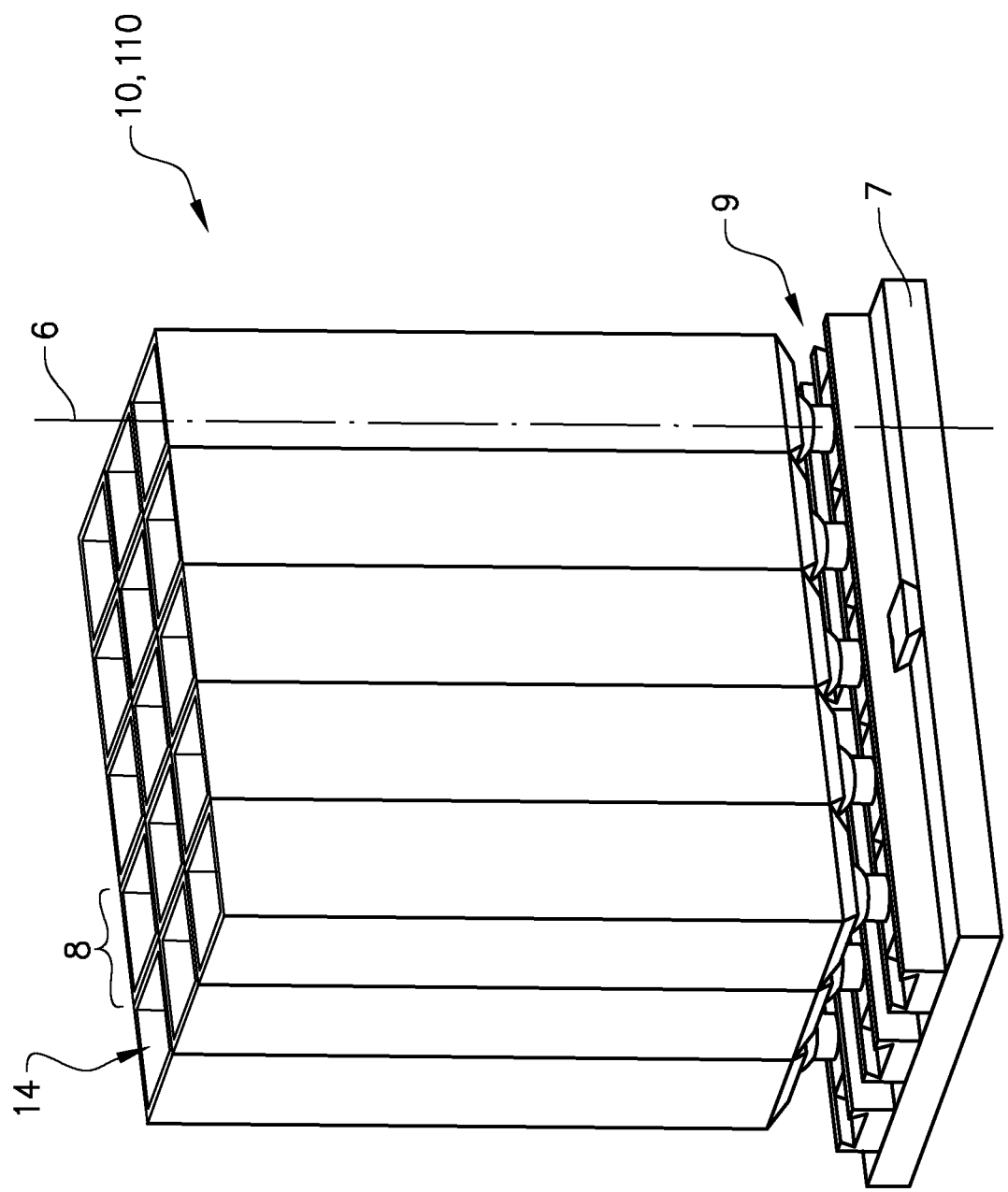
Figure 3B:
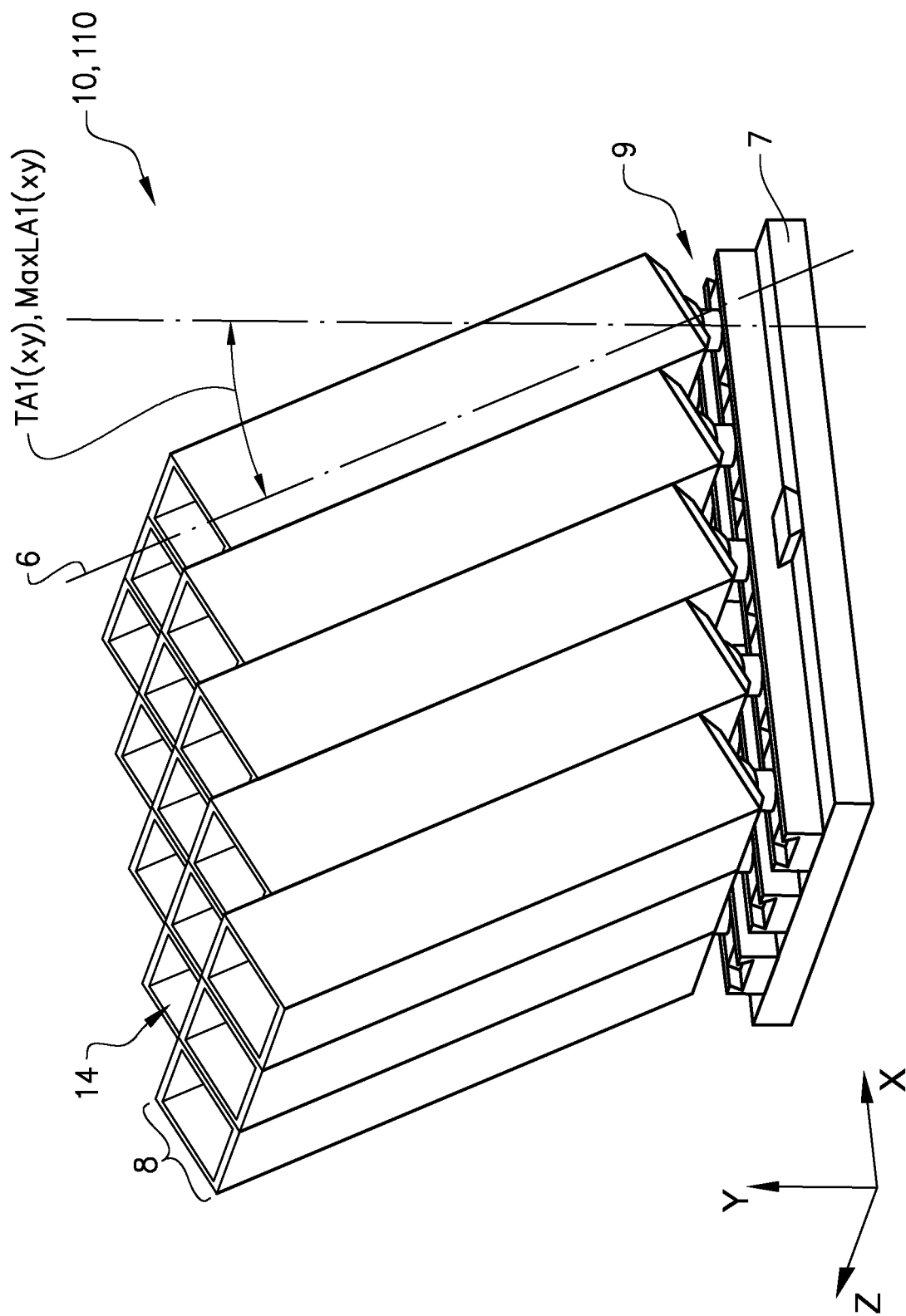
Figure 4A:
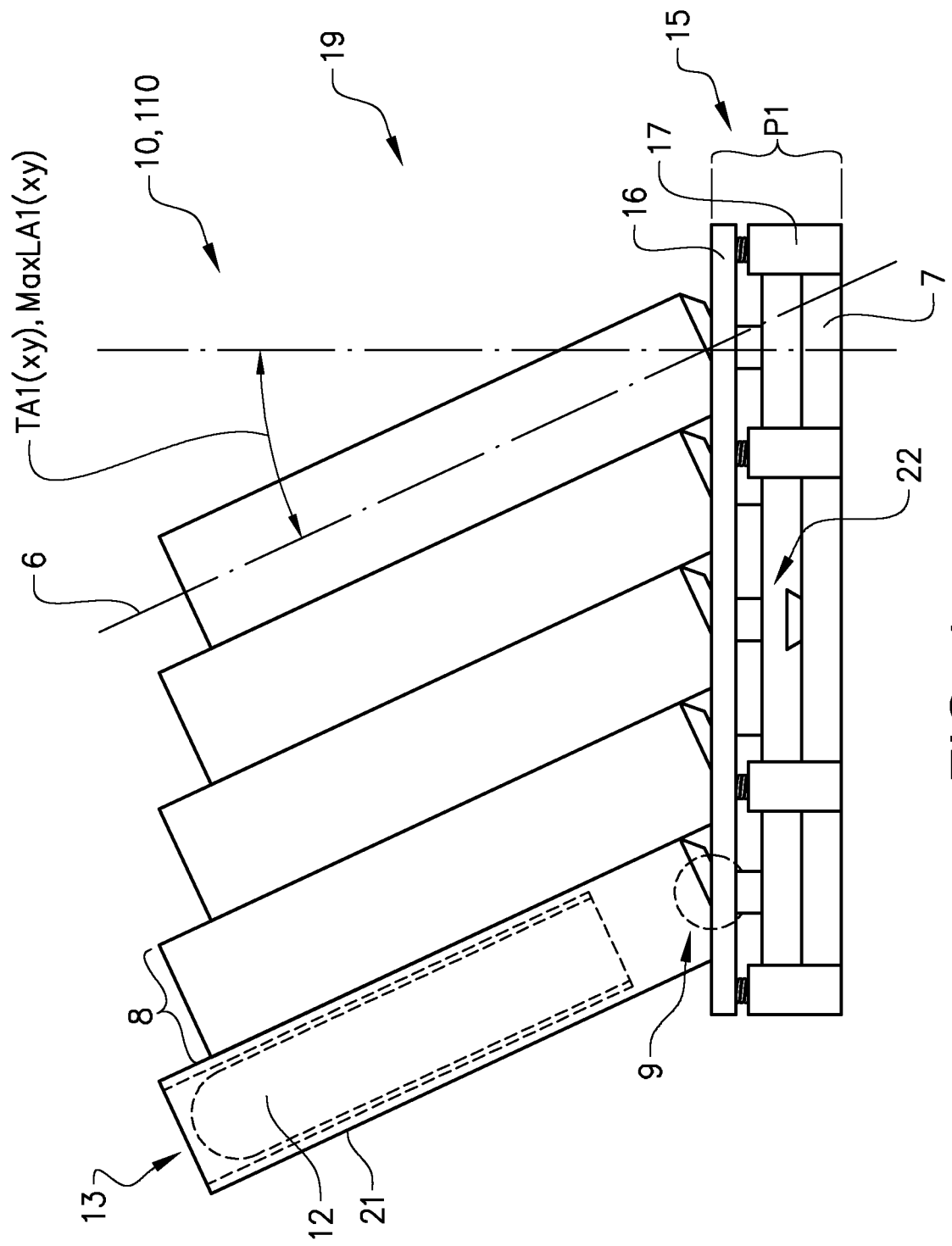

FIGS. 3a and 3b show an exemplary embodiment of a directable firing device 10, in FIGS. 3a and 3b in form of a variable magazine 110, in an ISO view. The variable magazine 110 comprises a plurality of cartridge cases 8 arranged in a matrix with a number of rows and a number of columns. A suitable number of rows may e.g. be 4-8 and a suitable number of columns may e.g. be 5-12, e.g. depending on the size of a cartridge. The exemplary embodiment of FIGS. 3a and 3b comprises 3 rows of cartridge cases 8 in 5 columns. A cartridge case 8 is designed with a longitudinal body, preferably having a square or rectangular cross-section. The cross-section of a cartridge may e.g. be 1*1 or 1*2 inches and the length may e.g. be 8 inches. Cartridge cases are adapted to receive e.g. countermeasures such as e.g. flares, chaff, shotgun shots, pellet loads or similar, stored in a cartridge 12 as is shown in FIG. 4a. Each cartridge case 8 has an opening 14 through which the countermeasure or like can be launched or fired. Thus, the direction in which the opening 14 is pointing determines the direction in which the countermeasure or like is fired or launched.

The variable magazine 110 comprises a base 7, which constitute the base of the variable magazines 110 and is used to mount the variable magazines 110 to an aircraft, to a vehicle or in a stationary position by the use of any suitable attachment means. Each cartridge case 8 is attached to the base 7 through a flexible joint 9, allowing respective cartridge case 8 to be tilted in at least one direction in relation to the base 7.

The cartridge cases 8 are slidably arranged to each other such that they bear against each other and such that they can slide against each other in the longitudinal direction when the variable magazine 110 is tilted. The tilting of the variable magazine 110 is achieved by means of tilting means (not shown).

Referring to the XYZ coordinate system indicated in FIGS. 3a and 3b; for aspects of variable magazines 110 in which the cartridge cases 8 can be tilted in two directions, i.e. in the XY-plane and in the ZY-plane, the flexible joint 9 allows tilting of the cartridge cases 8 in XY-plane and ZY-plane. For such embodiments the flexible joint 9 may e.g. be in form of a ball joint. For aspects of variable magazines only capable of tilting in one direction, i.e. either the XY-plane or in the ZY-plane the flexible joint may e.g. be in form of a hinge.

FIG. 3a shows the exemplary embodiment of a variable magazine 110 wherein a cartridge centre axis 6 of a cartridge case 8 is directed in parallel to the Y-axis, thus is directed to be perpendicular to the X-axis and the Z-axis. The base 7 is directed in an XZ-plane. This position is used as a reference position in this description and is referred to as a resting position. The tilt angle of the variable magazine 110, i.e. the tilt angle of the cartridge centre axis 6, is zero degrees in the resting position.

FIG. 3b shows the exemplary embodiment of a variable magazine 110 in, what is referred to as, an active position.

In the active position the variable magazine 110, and thus the cartridge centre axis 6, is tilted with an angle referred to as first tilt angle TA1(xy), in a first direction in the XY-plane. In FIG. 3b the variable magazine 110 is only tilted in the XY-plane, but the active position may also involve tilting in the ZY-plane, or tilting in both the XY-plane and in the ZY-plane simultaneously. The first tilt angle TA1(xy) indicates the maximum tilt angle in the first direction in the XY-plane of the variable magazine 110, thus what has been referred to as first maximum launch angle MaxLA1(xy) for FIGS. 1a and 1b. This angle may e.g. be 45 degrees.

Obviously the variable magazine 110 may also be tilted in the opposite, second direction in the XY-plane, in which direction the maximum angle in which the variable magazine could be tilted would be the second maximum launch angle MaxLA2(xy).

Thus, the cartridge cases 8 of the variable magazine 110 are configured to e.g. be tiltable from the resting position shown in FIG. 3a to the active position shown in FIG. 3b. Since adjacent cartridge cases 8 are arranged to each other in a slidable manner, the variable magazine 110 can be tilted by a tilting means to any selected angle.

When mounted on an aircraft such as a helicopter, the tilting of a variable magazine from a resting position to an active position may e.g. be due to that direction of the variable magazine is configured according to a detected, incoming threat, whereby by directing the variable magazine towards the incoming threat, countermeasures can be launched from the variable magazine towards the incoming threat. The direction of the variable magazine can also be used to compensate for that the orientation of the helicopter in the air changes during flight.

A cartridge case 8 is adapted to receive a countermeasure 13 stored in a cartridge 12 as is shown in FIG. 4a. The countermeasure cartridge 12 may be attached to the cartridge case 8 according to any commonly known manner. The countermeasure cartridge 12 is further connected to a launch system of the aircraft, comprising a firing control. The interface between the countermeasure cartridge 12 and the electronic control unit of the aircraft may be a mechanical system, which can only launch the countermeasure, or it may be an electrical interface, comprising two-way communication between the countermeasure cartridge 12 and the aircraft.

Thus, the variable magazine comprises a plurality of longitudinal cartridge cases 8 forming the variable magazine 110, wherein each cartridge case 8 comprises side walls 21 and a front opening 14, and wherein the side walls 21 of two adjacent cartridge cases 8 are arranged to each other in a slidable manner in a longitudinal direction. The variable magazine 110 comprises a tilting means 22 adapted to tilt the cartridge cases 8 such that the openings 14 of the cartridge cases 8 can be directed in a selected direction. The tilting means 22 schematically shown in FIGS. 4a and 4b is just one possible realization of tilting means out of the many possible.

Further, FIG. 4a discloses a similar exemplary embodiment of a directable firing device 10 in form of a variable magazine 110 as in FIG. 3b, also in an active position, thus tilted a first tilt angle TA1(xy), from a side view. The exemplary embodiment of FIG. 4a also discloses a firing direction limitation device 15 comprising a limiting structure 16 and a number of actuators 17. The firing direction limitation device 15, comprising the limiting structure 16, and the directable firing device 10 together forms a countermeasure arrangement 19 as defined according to the present invention. The limiting structure 16 of the firing direction limitation device 15 is moveable between a first position P1 and a second position P2. FIG. 4a discloses the limiting structure 16 in the first position P1, in which the limiting structure 16 is retracted.

Figure 4B:
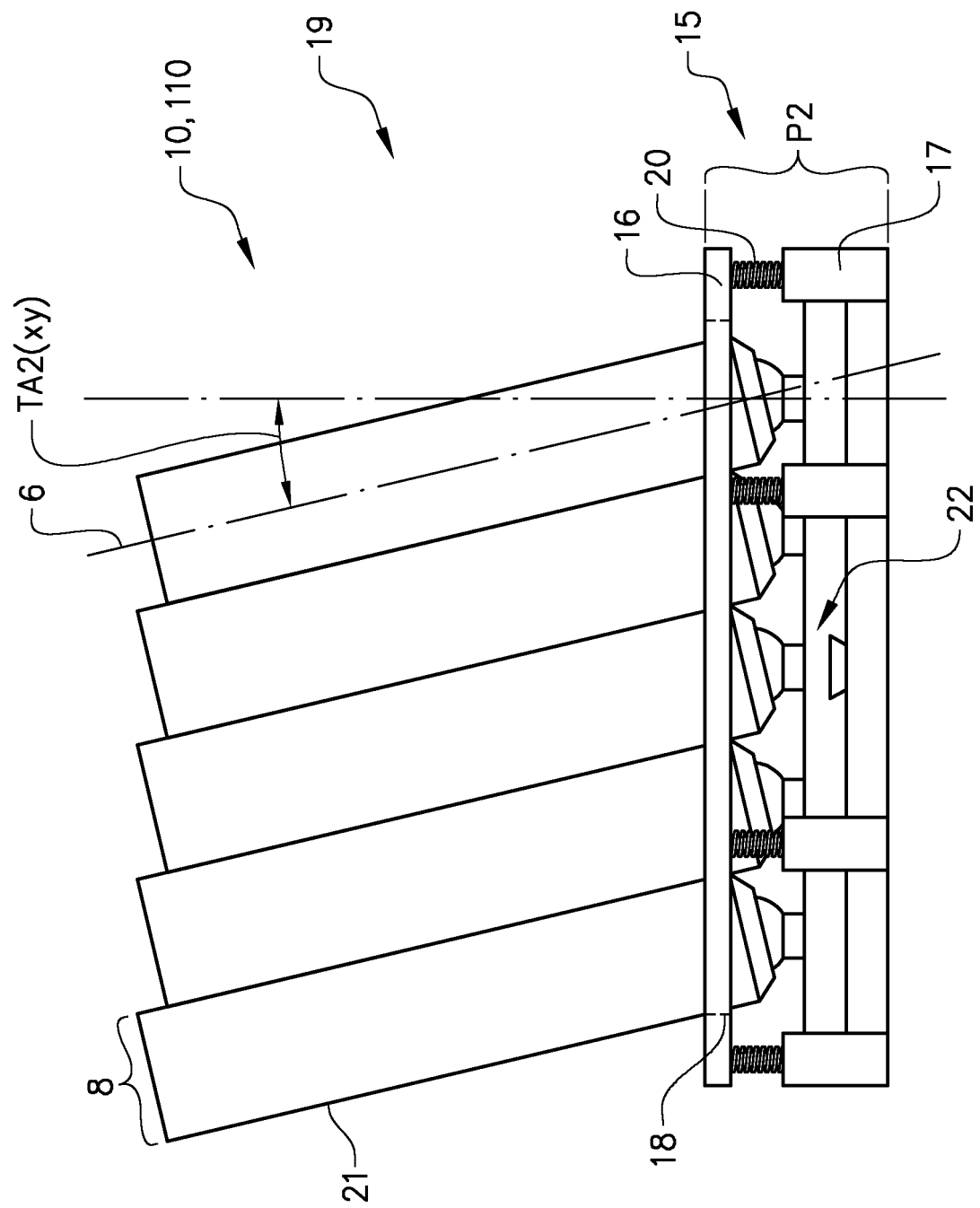

FIG. 4b discloses the limiting structure 16 in the second position P2, in which the limiting structure 16 is projected. The projection movement of the limiting structure 16, and also a possible subsequent retraction movement, is performed by means of actuators 17. In FIGS. 4a and 4b, four actuators are visible.

In the first position P1, the variable magazine 110 may be tilted in a first direction in the XY-plane at the maximum angle in which the variable magazine 110 is tiltable, i.e. the first maximum launch angle MaxLA1(xy). The limiting structure 16 is set in the first position P1 and do not limit or restrict the movements of the variable magazine 110.

In FIG. 4b the limiting structure 16 is projected and is set in the second position P2. When set in the second position P2, the inner delimitation surface 18 abuts the side wall 21 of the peripheral cartridge case 8 whereby the movements of the variable magazine the first direction in the XY-plane is restricted or limited. Thus, the second tilt angle TA2(xy), which is the maximum angle the variable magazine 110 can be tilted in the first direction in the XY-plane when the limiting structure is set in the second position P2, is smaller than the first tilt angle TA1(xy), which is the maximum angle in which the variable magazine 110 can be tilted in the first direction in the XY-plane when the limiting structure is set in the first position P1, as is shown in FIG. 4a.

The actuators 17 may e.g. be solenoid actuators. According to the exemplary embodiment of FIGS. 4a and 4b, the actuators are spring-loaded by means of a coil spring 20. Applying spring-loaded actuators 17 has the advantage that if the actuators 17 fail, the spring force exerted by the coil spring 20 allows the limiting structure 16 to be in the second position P2. Thus, if the actuators 17 fail, the more limited allowed launch angle range LARa2 will be the default launch angle range.

The actuators may also comprise e.g. a motor having a threaded axle cooperating with a threaded hole in the limiting structure.

As in FIGS. 3a and 3b, in FIGS. 4a and 4b the limiting structure 16 is configured to be arranged in connection to the directable firing device 10, in FIGS. 3a, 3b, 4a and 4b provided in form of a variable magazine 110. Further, in FIGS. 3a, 3b, 4a and 4b the variable magazine 110 is only tilted in a first direction in the XY-plane, but obviously the variable magazine 110 can also be tilted in the opposite, second direction in the XY-plane and also in the first and second direction in the ZY-plane. The limiting structure 16 will have the same, limiting affect when set in the second position P2 also in these tilting directions.

For an exemplary embodiment of directable firing device 10 provided in form of a variable magazine 110, the base 7, which is the base of the variable magazine 110, is used to mount the variable magazine 110 to e.g. an aircraft by the use of an attachment means. The variable magazine 110 may be mounted directly to an attachment bracket on the aircraft with suitable mounting means. It is also possible to mount the variable magazine 110 to an adapter bracket, which is used to create an interface for an existing mounting bracket on an aircraft. By using a suitable adapter bracket, the magazine can be mounted to an aircraft provided with standardized mounting brackets for fixed magazines. In this way, there is no need to upgrade the aircraft with new mounting brackets. Further, by using an adapter bracket, both fixed magazines and variable magazines can be used, depending on the actual needs.

In addition to being used to mount the variable magazine 110 to an aircraft, the base 7 is also used to absorb recoil force created when a countermeasure or similar is launched or fired. The base 7 will absorb and distribute the created force over the entire base area of the base 7.

Figure 5A:
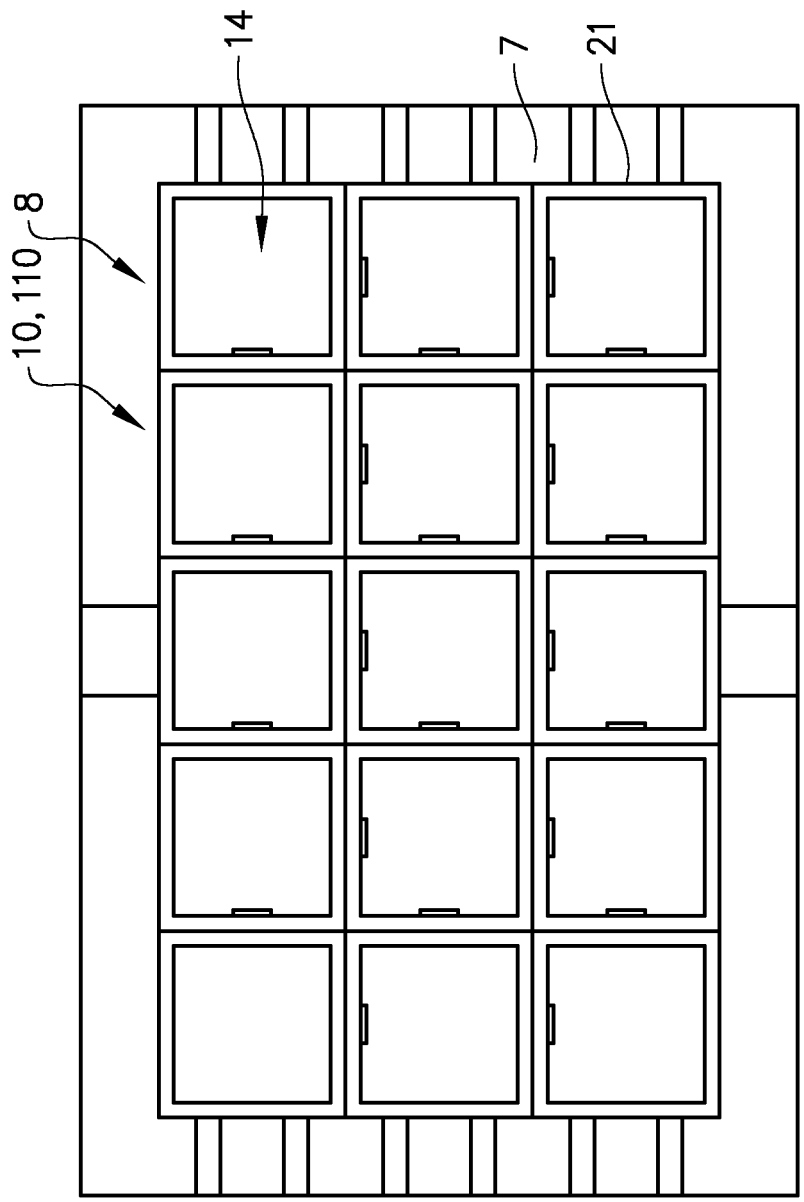

FIG. 5a discloses an exemplary embodiment of a directable firing device 10 in form of a variable magazine 110 in a top view. In FIG. 5a a variable magazine 110 comprising 3 rows of cartridge cases 8 in 5 columns is shown, wherein the cartridge cases are of the dimension 1*1 inch. Also other numbers of rows and/or columns are possible, as well as other dimensions of the cartridge cases 8, such as e.g. 1*2 inches. The length of the cartridge case 8 may e.g. be 8 inches. In FIG. 5a the openings 14 of the cartridge cases 8 are directed essentially in the Y-direction. In the shown view, a firing direction limitation device is not shown.

Figure 5B:
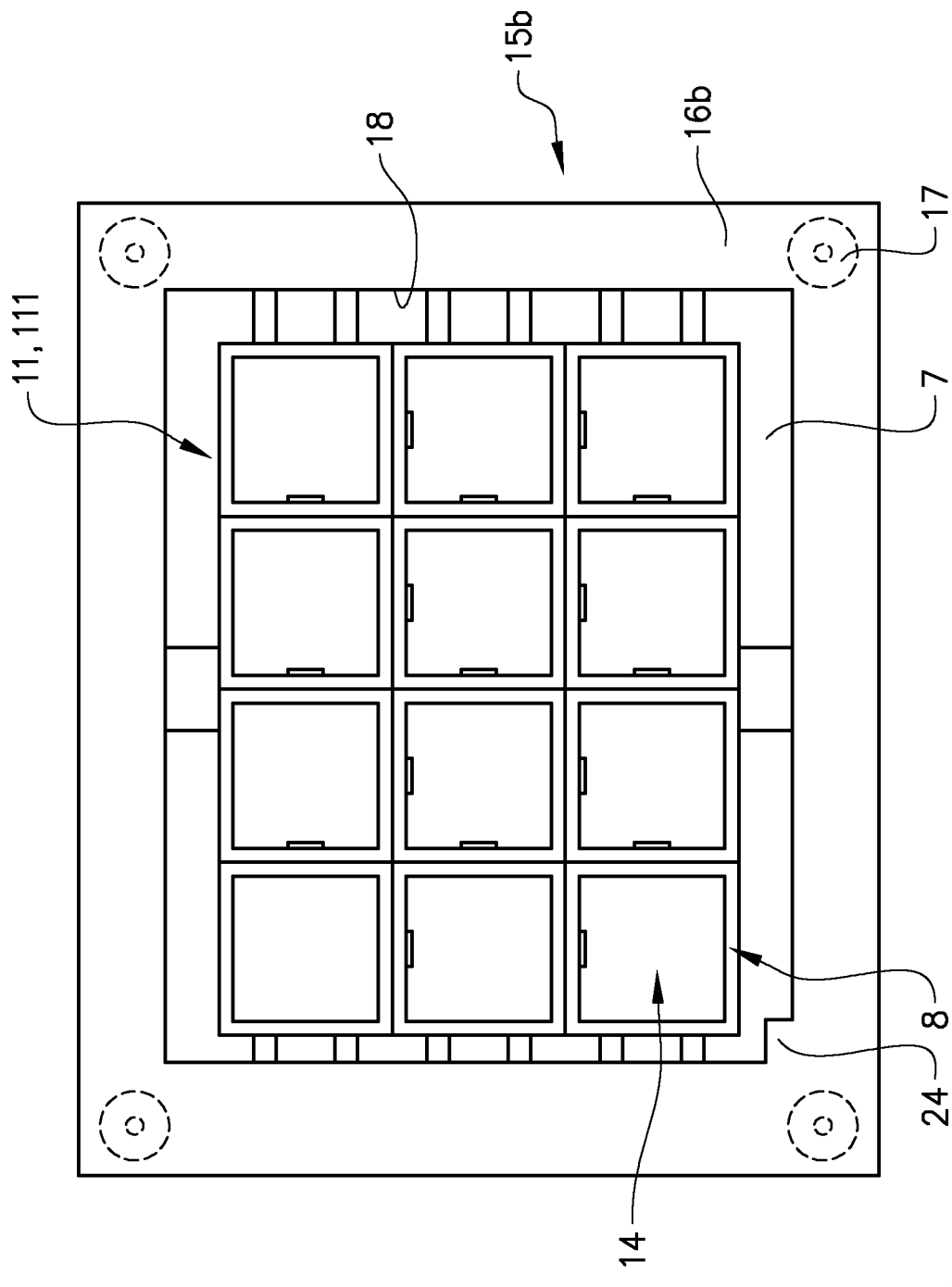
Figure 5C:
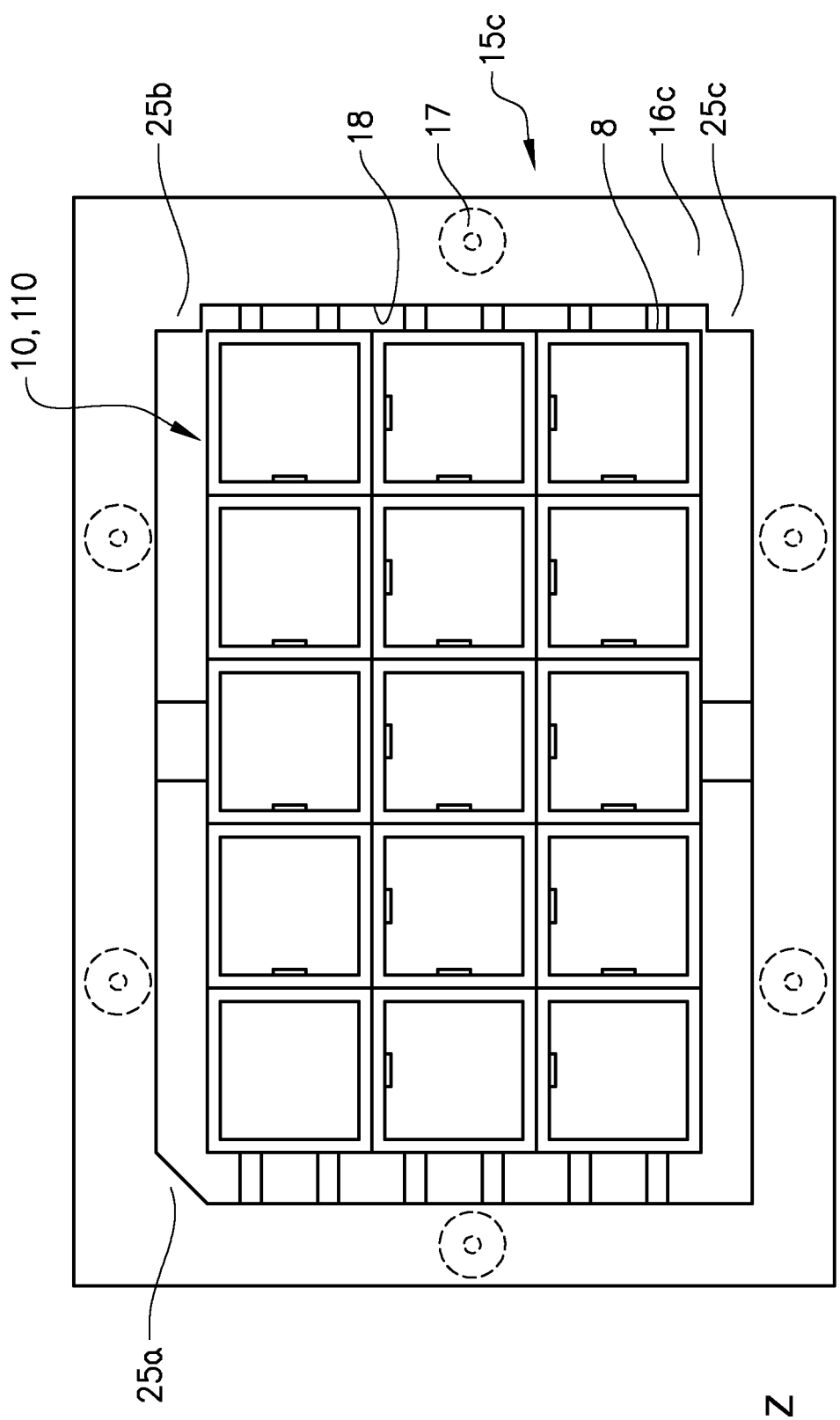

FIGS. 5b, 5c and 5d schematically discloses how various embodiments of firing direction limitation devices 15b, 15c, 15d comprising various configurations of limiting structures 16b, 16c, 16d arranged in connection to directable firing devices 10, 11, in FIGS. 5b to 5d in form of variable magazines 110, 111, may be configured.

FIG. 5b discloses an exemplary embodiment of a firing direction limitation device 15b wherein the directable firing device 11 in form of a variable magazine 111 is provided with a limiting structure 16b in a top view. The embodiment of a variable magazine 111 of FIG. 5b comprises 3 rows of cartridge cases 8 in 4 columns. The limiting structure 16b has an inner delimitation surface 18. When the limiting structure 16b is set in the second position P2, thus is projected by means of actuators 17, the inner delimitation surface 18 of the limiting structure 16b will restrict the movements in the X-direction in the XY-plane and in the Z-direction in the ZY-plane of the variable magazine 111. Thereby, the second launch angle range both in the X-direction in the XY-plane and in the Z-direction in the ZY-plane will be restricted. In FIG. 5b four actuators 17 are arranged in the corners of the limiting structure 16b. The restriction of movement in different directions may differ, such that it may e.g. be +30 degrees and −15 degrees in the X-direction and +−25 degrees in the Z-direction. The firing direction limitation device 15b is further provided with an additional restriction section 24 that will limit the movement of the variable magazine additionally along the X-direction and Z-direction in dependency of the actual tilt angle in a specific direction. In the shown example, the restriction section will limit the movement of the variable magazine in the −Z-direction when the variable magazine is tilted less than e.g. 5 degrees in the +X-direction, and will limit the movement of the variable magazine in the −X-direction when the variable magazine is tilted more than e.g. 10 degrees in the −Z-direction. Such a limitation can e.g. correspond to the direction to a door or hatch of the aircraft.

FIG. 5c discloses another exemplary embodiment of a firing direction limitation device 15c wherein the directable firing device 10 in form of a variable magazine 110 is provided with a limiting structure 16c in a top view. The embodiment of a variable magazine 110 of FIG. 5c comprises 3 rows of cartridge cases 8 in 5 columns. The limiting structure 16c has an inner delimitation surface 18. When the limiting structure is set in the second position P2, thus is projected by means of actuators 17, the inner delimitation surface 18 of the limiting structure 16c will restrict the movements in the X-direction in the XY-plane and in the Z-direction in the ZY-plane of the variable magazine 110. Thereby the second launch angle range both in the X-direction in the XY-plane and in the Z-direction in the ZY-plane will be restricted. In FIG. 5c six actuators 17 are arranged to enable the limiting structure 16c to move between a projected and a retracted position, i.e. the first position and the second position.

The restriction of movement in different directions may differ, such that it may e.g. be +15 degrees and −25 degrees in the X-direction and +−20 degrees in the Z-direction. The firing direction limitation device 15c is further provided with additional restriction sections 25a, 25b and 25c that will limit the movement of the variable magazine additionally along the X-direction and the Z-direction in dependency of the actual tilt angle in a specific direction. In the shown example, the restriction section 25a will limit movement of the variable magazine in the Z-direction and in the −X-direction in a combination, where the restriction of movement in the Z-direction will be proportional to the tilt angle of the variable magazine in the −X-direction. The restriction sections 25b and 25c will allow movement of the variable magazine in the +X-direction only when the variable magazine is not tilted in the +Z-direction or −Z-direction. Such a limitation can e.g. correspond to the direction to a door or hatch of the aircraft.

Compared to the exemplary embodiment of a directable firing device 11, provided in form of a variable magazine 111, of FIG. 5b the exemplary embodiment of a directable firing device 10, provided in form of a variable magazine 110, of FIG. 5c has a larger spatial extension in the X-direction due to that the variable magazine of FIG. 5c comprises 5 columns of cartridge cases 8. This, i.e. the spatial extension, is something that needs to be considered when the limiting structure is configured for respective implementation of the present invention. The spatial extension in the Z-direction is the same since both the exemplary embodiment of FIGS. 5b and 5c comprises 3 rows of cartridge cases 8. Also, the spatial extension in the X-direction and in the Z-direction needs to be considered since the point of launch/firing will differ significantly between individual cartridge cases 8 of a variable magazine 110. These are aspects that do not have to be considered when providing a firing direction limitation device for a directable firing device provided in form of e.g. a canon or a machine gun.

FIG. 5d schematically shows yet another exemplary embodiment of a firing direction limitation device 15d, wherein the directable firing device 10 in form of a variable magazine 110 is provided with a limiting structure 16d in a top view. The limiting structure 16d disclosed in FIG. 5d is provided in form of a sector portion having an inner delimitation surface 23, wherein the inner delimitation surface 23, when the limiting structure is set in the second position, determines the second launch angle range. The sector portion of the limiting structure 16d of FIG. 5d is provided in form of a portion of a square, here an L-shaped structure, wherein the limiting structure 16d, when set in the second position, will only affect the freedom of movement of the variable magazine 110 in certain directions, i.e. the second launch angle range will only be limited in certain directions. As can be seen in FIG. 5d, the variable magazine 110 will be limited in the −X-direction and in the −Z-direction. The possible movement in the positive X-direction will be the same as when the limiting structure 16d is in the first position, and the possible movement in the positive Z-direction will be the same as when the limiting structure 16d is in the first position.

The terminology used herein is for the purpose of describing particular exemplary aspects or embodiments only and is not intended to be limiting of the invention. As used herein, the singular forms "a", "an" and "the" are intended to include the plural forms as well, unless the context clearly indicates otherwise. It should further be understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this invention belongs. It should further be understood that terms used herein should be interpreted as having a meaning that is consistent with their meaning in the context of this specification and the relevant art and will not be interpreted in an idealized or overly formal sense unless expressly so defined herein.

The invention is not to be regarded as being limited to the embodiments described above, a number of additional variants and modifications being possible within the scope of the subsequent patent claims. The firing direction limitation device may be mounted to moving vehicles of all kinds and may also be mounted in a stationary manner, either fixed on e.g. a building or on a movable stand.

REFERENCE SIGNS

| | |
|---|---|
| 1: | Aircraft/Helicopter |
| 2: | Aircraft fuselage |
| 3: | Direction of launch |
| 4(a-b): | Launch sector |
| 5: | Main rotor |
| 6: | Cartridge centre axis |
| 7: | Base |
| 8: | Cartridge case |
| 9: | Flexible joint |
| 10: | Directable firing device |
| 10a: | First directable firing device |
| 10b: | Second directable firing device |
| 10c: | Third Directable firing device |
| 11: | Fourth directable firing device |
| 12: | Countermeasure cartridge |
| 13: | Countermeasure |
| 14: | Opening |
| 15(b-d): | Firing direction limitation device |
| 16(b-d): | Limiting structure |
| 17: | Actuator |
| 18: | Inner delimitation surface |
| 19: | Countermeasure arrangement |
| 20: | Spring |
| 21: | Side walls |
| 22: | Tilting means |
| 23: | Inner delimitation surface |
| 24: | Restriction section |
| 25(a-c): | Restriction section |
| 50: | Tail rotor |
| 110: | Variable magazine |
| 110a: | First variable magazine |
| 110b: | Second variable magazine |
| 110c: | Third variable magazine |
| 111: | Fourth variable magazine |
| MaxLA1*: | First maximum launch angle |
| MaxLA2*: | Second maximum launch angle |
| LimLA1*: | First limited launch angle |
| LimLA2*: | Second limited launch angle |
| LARa1*: | First launch angle range |
| LARa2*: | Second launch angle range |
| TA1*: | First tilt angle |
| TA2*: | Second tilt angle |
| P1: | First position |
| P2: | Second position |

*= the reference signs may be indexed in order to indicate in what plane in a system of coordinates they indicate movements, angles etc.

The invention claimed is:

1. Firing direction limitation device (15) for controlling the allowed launch angle range of a directable firing device (10) tiltable between at least two allowed maximum launch angles (MaxLA1, MaxLA2) defining a launch sector (4), wherein:
the firing direction limitation device (15) comprises a moveable limiting structure (16) configured to be arranged in connection with the directable firing device (10),
the limiting structure (16) is configured to be moveable between a first position (P1) and a second position (P2), wherein:
when the limiting structure (16) is set in the first position (P1), the directable firing device (10) is moveable within a first launch angle range (LARa1), and
when the limiting structure (16) is set in the second position (P2), the directable firing device (10) is moveable within a second launch angle range (LARa2),
wherein the second launch angle range (LARa2) is limited in relation to the first launch angle range (LARa1), whereby the allowed launch angle range of the directable firing device (10) is controllable, and
wherein:
the directable firing device (10) is a variable magazine (110),
the variable magazine (110) comprises a plurality of longitudinal cartridge cases (8) forming the variable magazine (110),
each cartridge case (8) comprises side walls (21) and a front opening (14),
the side walls (21) of two adjacent cartridge cases (8) are arranged to each other in a slidable manner in a longitudinal direction, and
the variable magazine (110) comprises a tilting means (22) adapted to tilt the cartridge cases (8), such that the openings (14) of the cartridge cases (8) can be directed in a selected direction.

2. Firing direction limitation device (15) according to claim 1, wherein the second launch angle range (LARa2) is limited in azimuth direction in relation to the first launch angle range (LARa1).

3. Firing direction limitation device (15) according to claim 1, wherein the second launch angle range (LARa2) is limited in elevation direction in relation to the first launch angle range (LARa1).

4. Firing direction limitation device (15) according to claim 1, wherein:
the moveable limiting structure (16) is in form of a sector portion having an inner delimitation surface (23), and
the inner delimitation surface (23) determines the second launch angle range (LARa2).

5. Firing direction limitation device (15) according to claim 1, wherein:
the moveable limiting structure (16) is in form of an encircling portion having an inner delimitation surface (18), and the inner delimitation surface (18) determines the second launch angle range (LARa2).

6. Firing direction limitation device (15) according to claim 5, wherein the inner delimitation surface (18) of the encircling portion is essentially circular, essentially square, essentially rectangular or irregularly shaped.

7. Firing direction limitation device (15) according to claim 1, wherein:
   the movements of the limiting structure (16) are projecting and retracting movements, and
   the projecting/retracting movements are controllable by means of at least one actuator (17).

8. Firing direction limitation device (15) according to claim 7, wherein the at least one actuator (17) is a solenoid actuator.

9. Countermeasure arrangement (19), wherein:
   the countermeasure arrangement (19) comprises the firing direction limitation device (15) according to claim 1, and a directable firing device (10), and
   the firing direction limitation device (15) is arranged in connection with the directable firing device (10) such that the allowed launch angle range of the directable firing device (10) is controllable.

10. Method for controlling the firing direction of a directable firing device (10) by means of a firing direction limitation device (15), wherein the directable firing device (10) is a variable magazine (110) comprising a plurality of longitudinal cartridge cases (8), each cartridge case (8) comprising side walls (21) and a front opening (14), the side walls (21) of two adjacent cartridge cases (8) being arranged relative to one another in a slidable manner in a longitudinal direction, the variable magazine (11) comprising a tilting means (22) adapted to tilt the cartridge cases (8) such that the front openings (14) of the cartridge cases (8) are selectively tiltable between at least two allowed launch angles (MaxLA1, MaxLA2) defining a launch sector (4), wherein the firing direction limitation device comprises:
   a moveable limiting structure (16) configured to be arranged in connection with the directable firing device (10), and wherein:
   the limiting structure (16) is configured to be moveable between a first position (P1) and a second position (P2), wherein:
      when the limiting structure (16) is set in the first position (P1), the directable firing device (10) is moveable within a first launch angle range (LARa1), and
      when the limiting structure (16) is set in the second position (P2), the directable firing device (10) is moveable within a second launch angle range (LARa2),
   the second launch angle range (LARa2) is limited in relation to the first launch angle range (LARa1), and
   the method comprises the method step of, when it is desired to limit the allowed launch angle range of the directable firing device (10), setting the limiting structure (16) in the second position (P2).

11. Method according to claim 10 further comprising the steps of:
   detecting that a safe operation mode is desired, and
   setting the limiting structure (16) in the second position (P2) when it has been detected that a safe operation mode is desired.

12. Method according to claim 11, wherein:
   the safe operation mode is detected when one operation from a predefined group of operations is initiated, and the predefined group of operations comprises opening a side door, opening a cargo bay door, and detecting a defined weight-on-wheels.

13. An aircraft (1), comprising a firing direction limitation device (15) for controlling the allowed launch angle range of a directable firing device (10) tiltable between at least two allowed maximum launch angles (MaxLA1, MaxLA2) defining a launch sector (4), wherein:
   the firing direction limitation device (15) comprises a moveable limiting structure (16) configured to be arranged in connection with the directable firing device (10),
   the limiting structure (16) is configured to be moveable between a first position (P1) and a second position (P2), wherein:
      when the limiting structure (16) is set in the first position (P1), the directable firing device (10) is moveable within a first launch angle range (LARa1), and
      when the limiting structure (16) is set in the second position (P2), the directable firing device (10) is moveable within a second launch angle range (LARa2), and
   wherein the second launch angle range (LARa2) is limited in relation to the first launch angle range (LARa1), whereby the allowed launch angle range of the directable firing device (10) is controllable.

14. Aircraft according to claim 13, wherein:
   the movements of the limiting structure (16) are projecting and retracting movements, and
   the projecting/retracting movements are controllable by means of at least one actuator (17).

15. Aircraft according to claim 14, wherein the at least one actuator (17) is a solenoid actuator.

16. Aircraft according to claim 13, wherein the second launch angle range (LARa2) is limited in elevation direction in relation to the first launch angle range (LARa1).

17. Method for controlling the firing direction of a directable firing device (10) by means of a firing direction limitation device (15), wherein the directable firing device (10) is tiltable between at least two allowed launch angles (MaxLA1, MaxLA2) defining a launch sector (4), wherein the firing direction limitation device comprises:
   a moveable limiting structure (16) configured to be arranged in connection with the directable firing device (10), and wherein:
   the limiting structure (16) is configured to be moveable between a first position (P1) and a second position (P2), wherein:
      when the limiting structure (16) is set in the first position (P1), the directable firing device (10) is moveable within a first launch angle range (LARa1), and
      when the limiting structure (16) is set in the second position (P2), the directable firing device (10) is moveable within a second launch angle range (LARa2),
   the second launch angle range (LARa2) is limited in relation to the first launch angle range (LARa1), and
   the method comprises the steps of:
      detecting that a safe operation mode is desired, the safe operation mode being configured to limit the allowed launch angle range of the directable firing device (10), and
      when it detected that the safe operation mode is desired, setting the limiting structure (16) in the second position (P2).

18. Method according to claim 17, wherein:
the safe operation mode is detected when one operation from a predefined group of operations is initiated, and
the predefined group of operations comprises opening a side door, opening a cargo bay door, and detecting a defined weight-on-wheels.

* * * * *